US010801298B2

(12) United States Patent
Hughes et al.

(10) Patent No.: US 10,801,298 B2
(45) Date of Patent: Oct. 13, 2020

(54) DOWNHOLE TOOL WITH TETHERED BALL

(71) Applicant: The WellBoss Company, LLC, Houston, TX (US)

(72) Inventors: David Hughes, Houston, TX (US); Evan Lloyd Davies, Houston, TX (US); Luis Miguel Avila, Pearland, TX (US)

(73) Assignee: The WellBoss Company, LLC, Houston, TX (US)

( * ) Notice: Subject to any disclaimer, the term of this patent is extended or adjusted under 35 U.S.C. 154(b) by 0 days.

(21) Appl. No.: 16/387,985

(22) Filed: Apr. 18, 2019

(65) Prior Publication Data
US 2019/0323314 A1 Oct. 24, 2019

Related U.S. Application Data

(60) Provisional application No. 62/661,228, filed on Apr. 23, 2018.

(51) Int. Cl.
E21B 33/129 (2006.01)
F16K 15/04 (2006.01)
E21B 33/12 (2006.01)

(52) U.S. Cl.
CPC .............. E21B 33/12 (2013.01); F16K 15/04 (2013.01); E21B 33/1293 (2013.01)

(58) Field of Classification Search
CPC .............. E21B 33/1204; E21B 33/129; E21B 33/1294; E21B 34/063; F16K 15/04
See application file for complete search history.

(56) References Cited

U.S. PATENT DOCUMENTS

| 2,230,712 A | | 2/1941 | Bendeler et al. | |
| 2,254,246 A | * | 9/1941 | Scaramucci | E21B 33/16 166/113 |
| 2,683,492 A | | 7/1954 | Baker | |
| 2,797,758 A | | 7/1957 | Showalter | |
| 2,884,938 A | * | 5/1959 | Hildebrandt | E21B 21/10 137/68.17 |

(Continued)

FOREIGN PATENT DOCUMENTS

| EP | 0136659 | 4/1985 |
| EP | 0504848 | 9/1992 |

(Continued)

OTHER PUBLICATIONS

International Preliminary Report on Patentability, PCT/US2012/051938, 6 pages, dated Feb. 25, 2014.

(Continued)

Primary Examiner — Cathleen R Hutchins
(74) Attorney, Agent, or Firm — Rao DeBoer Osterrieder, PLLC; John M. DeBoer

(57) ABSTRACT

A downhole tool having a mandrel, a first slip, a second slip, a lower sleeve, and a tethered ball assembly. The mandrel includes a proximate end; a distal end; a bore having a ball seat associated therewith; and an outer surface. The first slip is disposed around the mandrel. The second slip is disposed around the mandrel. The lower sleeve is proximate to the first slip, and engaged with the outer surface at the distal end. The tethered ball assembly includes a ball; a drag; and at least one tether coupled between the ball and the drag.

18 Claims, 21 Drawing Sheets

(56) References Cited

U.S. PATENT DOCUMENTS

| | | |
|---|---|---|
| 3,163,225 A | 12/1964 | Perkins |
| 3,343,607 A | 9/1967 | Current |
| 3,422,898 A | 1/1969 | Conrad |
| 3,687,196 A | 8/1972 | Mullins |
| 3,769,127 A | 10/1973 | Goldsworthy et al. |
| 3,776,561 A | 12/1973 | Haney |
| 4,359,090 A | 11/1982 | Luke |
| 4,388,971 A | 6/1983 | Peterson |
| 4,436,150 A | 3/1984 | Barker |
| 4,437,516 A | 3/1984 | Cockrell |
| 4,440,223 A | 4/1984 | Akkerman |
| 4,469,172 A | 9/1984 | Clark |
| 4,630,690 A | 12/1986 | Beasley et al. |
| 4,711,300 A | 12/1987 | Wardlaw et al. |
| 4,784,226 A | 11/1988 | Wyatt |
| 5,025,858 A | 6/1991 | Glaser |
| 5,048,606 A | 9/1991 | Allwin |
| 5,113,940 A | 5/1992 | Glaser |
| 5,147,857 A | 9/1992 | Raddatz et al. |
| 5,224,540 A | 7/1993 | Streich et al. |
| 5,246,069 A | 9/1993 | Glaser et al. |
| 5,253,714 A | 10/1993 | Davis et al. |
| 5,333,685 A | 8/1994 | Gilbert |
| 5,376,200 A | 12/1994 | Hall |
| 5,449,040 A | 9/1995 | Milner |
| 5,484,040 A | 1/1996 | Penisson |
| 5,819,846 A | 10/1998 | Bolt et al. |
| 5,839,515 A | 11/1998 | Yuan et al. |
| 5,842,517 A | 12/1998 | Coone |
| 5,927,403 A | 7/1999 | Dallas |
| 5,967,352 A | 10/1999 | Repp |
| 5,984,007 A | 11/1999 | Yuan |
| 6,167,963 B1 | 1/2001 | McMahan et al. |
| 6,241,018 B1 | 6/2001 | Eriksen |
| 6,353,771 B1 | 3/2002 | Southland |
| 6,354,372 B1 | 3/2002 | Carisella et al. |
| 6,425,442 B1 | 7/2002 | Latiolais et al. |
| 6,491,116 B2 | 12/2002 | Berscheidt et al. |
| 6,578,638 B2 | 6/2003 | Guillory |
| 6,708,768 B2 | 3/2004 | Slup et al. |
| 6,712,153 B2 | 3/2004 | Turley et al. |
| 6,899,181 B2 | 5/2005 | Simpson et al. |
| 7,044,230 B2 | 5/2006 | Starr et al. |
| 7,087,109 B2 | 8/2006 | Bredt et al. |
| 7,093,664 B2 | 8/2006 | Todd et al. |
| 7,255,178 B2 | 8/2007 | Slup et al. |
| 7,350,569 B2 | 4/2008 | Collins et al. |
| 7,350,582 B2 | 4/2008 | McKeachnie et al. |
| 7,475,736 B2 | 1/2009 | Lehr et al. |
| 7,484,940 B2 | 2/2009 | O'Neill |
| 7,735,549 B1 | 6/2010 | Nish et al. |
| 7,740,079 B2 | 6/2010 | Clayton et al. |
| 7,753,416 B2 | 7/2010 | Mazzaferro et al. |
| 7,762,323 B2 | 7/2010 | Frazier |
| 7,980,300 B2 | 7/2011 | Roberts et al. |
| 8,002,030 B2 | 8/2011 | Turley et al. |
| 8,016,295 B2 | 9/2011 | Guest et al. |
| 8,079,413 B2 | 12/2011 | Frazier |
| 8,113,276 B2 | 2/2012 | Greenlee et al. |
| 8,127,851 B2 | 3/2012 | Misselbrook |
| 8,167,033 B2 | 5/2012 | White |
| 8,205,671 B1 | 6/2012 | Branton |
| 8,211,248 B2 | 7/2012 | Marya |
| 8,231,947 B2 | 7/2012 | Vaidya et al. |
| 8,267,177 B1 | 9/2012 | Vogel et al. |
| D673,182 S | 12/2012 | Frazier |
| 8,336,616 B1 | 12/2012 | McClinton |
| 8,381,809 B2 | 2/2013 | White |
| 8,459,346 B2 | 6/2013 | Frazier |
| 8,469,088 B2 | 6/2013 | Shkurti et al. |
| 8,567,492 B2 | 10/2013 | White |
| 8,596,347 B2 | 12/2013 | Valencia et al. |
| 8,839,855 B1 | 2/2014 | McClinton et al. |
| 8,757,265 B1 * | 6/2014 | Cuffe .............. E21B 33/14 166/177.5 |
| 8,770,276 B1 | 7/2014 | Nish et al. |
| 8,770,280 B2 | 7/2014 | Buytaert et al. |
| 8,887,818 B1 | 11/2014 | Carr et al. |
| 8,893,780 B2 | 11/2014 | Greenlee et al. |
| 9,416,617 B2 | 8/2016 | Wiese et al. |
| 9,708,878 B2 | 7/2017 | Cooke, Jr. |
| 9,714,551 B2 | 7/2017 | Okura et al. |
| 9,745,847 B2 | 8/2017 | Ditzler et al. |
| 9,790,763 B2 | 10/2017 | Fripp et al. |
| D806,136 S | 12/2017 | Saulou et al. |
| 9,845,658 B1 | 12/2017 | Nish et al. |
| 9,982,506 B2 | 5/2018 | Walton et al. |
| 2003/0188876 A1 | 10/2003 | Vick et al. |
| 2003/0226660 A1 | 12/2003 | Winslow et al. |
| 2003/0236173 A1 | 12/2003 | Dobson et al. |
| 2004/0003928 A1 | 1/2004 | Frazier |
| 2004/0045723 A1 | 3/2004 | Slup et al. |
| 2004/0216868 A1 | 11/2004 | Owen, Sr. |
| 2005/0109502 A1 | 5/2005 | Buc Slay et al. |
| 2005/0183864 A1 | 8/2005 | Trinder |
| 2005/0194141 A1 | 9/2005 | Sinclair et al. |
| 2006/0243455 A1 | 11/2006 | Telfer |
| 2007/0003449 A1 * | 1/2007 | Hatamian ............ B01L 3/5021 422/400 |
| 2007/0039742 A1 | 2/2007 | Costa |
| 2007/0119600 A1 | 5/2007 | Slup et al. |
| 2008/0128133 A1 | 6/2008 | Turley et al. |
| 2008/0196879 A1 | 8/2008 | Broome et al. |
| 2008/0264627 A1 | 10/2008 | Roberts et al. |
| 2008/0277162 A1 | 11/2008 | DiFoggio |
| 2009/0038790 A1 | 2/2009 | Barlow |
| 2009/0090516 A1 | 4/2009 | Delucia et al. |
| 2009/0229424 A1 | 9/2009 | Montgomery |
| 2009/0236091 A1 | 9/2009 | Hammami et al. |
| 2010/0155050 A1 | 6/2010 | Frazier |
| 2010/0263876 A1 | 10/2010 | Frazier |
| 2010/0276159 A1 | 11/2010 | Mailand et al. |
| 2010/0326660 A1 | 12/2010 | Ballard et al. |
| 2011/0024134 A1 | 2/2011 | Buckner |
| 2011/0048740 A1 | 3/2011 | Ward et al. |
| 2011/0048743 A1 | 3/2011 | Stafford et al. |
| 2011/0088891 A1 | 4/2011 | Stout |
| 2011/0094802 A1 | 4/2011 | Vatne |
| 2011/0186306 A1 | 8/2011 | Marya et al. |
| 2011/0232899 A1 | 9/2011 | Porter |
| 2011/0259610 A1 | 10/2011 | Shkurti et al. |
| 2011/0277989 A1 | 11/2011 | Frazier |
| 2011/0290473 A1 | 12/2011 | Frazier |
| 2012/0061105 A1 | 3/2012 | Neer et al. |
| 2012/0125642 A1 | 5/2012 | Chenault et al. |
| 2012/0181032 A1 | 7/2012 | Naedler et al. |
| 2012/0234538 A1 | 9/2012 | Martin et al. |
| 2012/0279700 A1 | 11/2012 | Frazier |
| 2013/0032357 A1 | 2/2013 | Mazyar et al. |
| 2013/0048315 A1 * | 2/2013 | VanLue .............. E21B 33/124 166/387 |
| 2013/0098600 A1 | 4/2013 | Roberts |
| 2013/0199790 A1 * | 8/2013 | Themig ............... E21B 23/14 166/305.1 |
| 2013/0240201 A1 | 9/2013 | Frazier |
| 2013/0306331 A1 | 11/2013 | Bishop et al. |
| 2014/0020911 A1 | 1/2014 | Martinez |
| 2014/0027127 A1 | 1/2014 | Frazier et al. |
| 2014/0045731 A1 | 2/2014 | Daccord |
| 2014/0090831 A1 | 4/2014 | Young et al. |
| 2014/0116677 A1 | 5/2014 | Sherlin |
| 2014/0120346 A1 | 5/2014 | Rochen |
| 2014/0190685 A1 | 7/2014 | Frazier et al. |
| 2014/0224476 A1 | 8/2014 | Frazier |
| 2014/0251641 A1 | 9/2014 | Marya et al. |
| 2014/0345875 A1 | 11/2014 | Murphree et al. |
| 2014/0345878 A1 | 11/2014 | Murphree et al. |
| 2014/0374163 A1 | 12/2014 | Rui et al. |
| 2015/0013996 A1 | 1/2015 | Davies et al. |
| 2015/0027737 A1 | 1/2015 | Rochen et al. |
| 2015/0068728 A1 | 3/2015 | Stage et al. |
| 2015/0083394 A1 | 3/2015 | Skarsen et al. |
| 2015/0144348 A1 | 5/2015 | Okura et al. |
| 2015/0239795 A1 | 8/2015 | Doud et al. |

(56) References Cited

U.S. PATENT DOCUMENTS

| | | |
|---|---|---|
| 2015/0252638 A1 | 9/2015 | Richards et al. |
| 2015/0275070 A1 | 10/2015 | Getzlaf et al. |
| 2015/0354313 A1 | 12/2015 | McClinton et al. |
| 2015/0368994 A1 | 12/2015 | Mhaskar et al. |
| 2016/0115759 A1 | 4/2016 | Richards et al. |
| 2016/0122617 A1 | 5/2016 | Murphree et al. |
| 2016/0123104 A1 | 5/2016 | Harris |
| 2016/0130906 A1 | 5/2016 | Garvey et al. |
| 2016/0160591 A1 | 6/2016 | Xu et al. |
| 2016/0201427 A1 | 7/2016 | Fripp et al. |
| 2016/0265305 A1 | 9/2016 | Davies et al. |
| 2016/0281458 A1 | 9/2016 | Greenlee |
| 2016/0305215 A1 | 10/2016 | Harris et al. |
| 2017/0044859 A1 | 2/2017 | Blair |
| 2017/0101836 A1 | 4/2017 | Webster et al. |
| 2017/0175488 A1 | 6/2017 | Lisowski et al. |
| 2017/0183950 A1 | 6/2017 | Gillis et al. |
| 2017/0260824 A1 | 9/2017 | Kellner et al. |
| 2017/0260825 A1 | 9/2017 | Schmidt et al. |
| 2017/0284167 A1 | 10/2017 | Takahashi et al. |
| 2017/0321514 A1 | 11/2017 | Crow |
| 2018/0179852 A1* | 6/2018 | Hou .................... E21B 33/1285 |

FOREIGN PATENT DOCUMENTS

| | | |
|---|---|---|
| EP | 0890706 | 1/1993 |
| EP | 1643602 | 4/2006 |
| WO | 2007014339 | 2/2007 |
| WO | 2008100644 | 8/2008 |
| WO | 20091128853 | 9/2009 |
| WO | 2011097091 | 8/2011 |
| WO | 2011160183 | 12/2011 |
| WO | 2014197827 | 12/2014 |
| WO | 2016032761 | 3/2016 |
| WO | 2016182545 | 11/2016 |

OTHER PUBLICATIONS

International Search Report, PCT/US2012/051938, 3 pages, dated Jan. 3, 2013.
International Preliminary Report on Patentability, PCT/US2012/051940, 6 pages, dated Feb. 25, 2014.
Written Opinion dated Jan. 3, 2013 for Intl App No. PCT/US2012/051938 (5 pages).
Search Report and Written Opinion dated Feb. 21, 2013 for Intl App No. PCT/US2012/051936 (9 pages).
Search Report and Written Opinion dated Feb. 27, 2013 for Intl App No. PCT/US2012/051940 (10 pages).
Search Report dated Mar. 11, 2013 for Intl App No. PCT/US2012/051934 (3 pages).
Lehr et al., "Best Practices for Multizone Isolation Using Composite Plugs," Society of Petroleum Engineers, SPE 142744 ConocoPhillips and Baker Hughes Conference Paper, dated Jun. 8, 2011 (40 pgs).
International Preliminary Report on Patentability, PCT/US2012/051934, 6 pages, dated Feb. 25, 2014.
International Preliminary Report on Patentability, PCT/US2012/051936, 5 pages, dated Feb. 25, 2014.
Search Report dated Feb. 27, 2013 for Intl App No. PCT/US2012/051940 (3 pages).
Search Report dated Feb. 21, 2013 for Intl App No. PCT/US2012/051936 (3 pages).
Search Report and Written Opinion dated Mar. 11, 2013 for Intl App No. PCT/US2012/051934 (10 pages).
Search Report and Written Opinion dated Aug. 19, 2019 for Intl App No. PCT/US2019/028061 (9 pages).

* cited by examiner

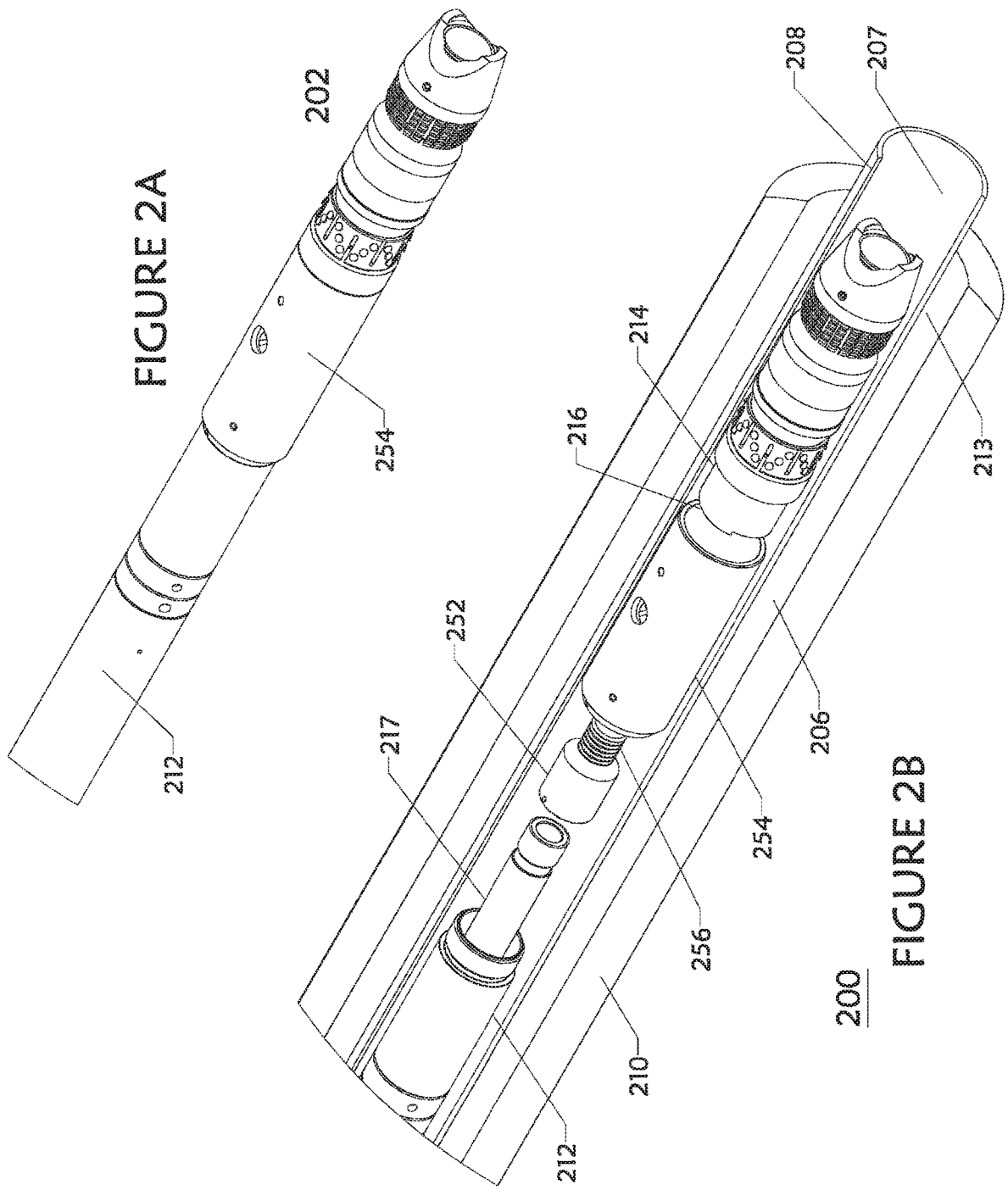

202

202

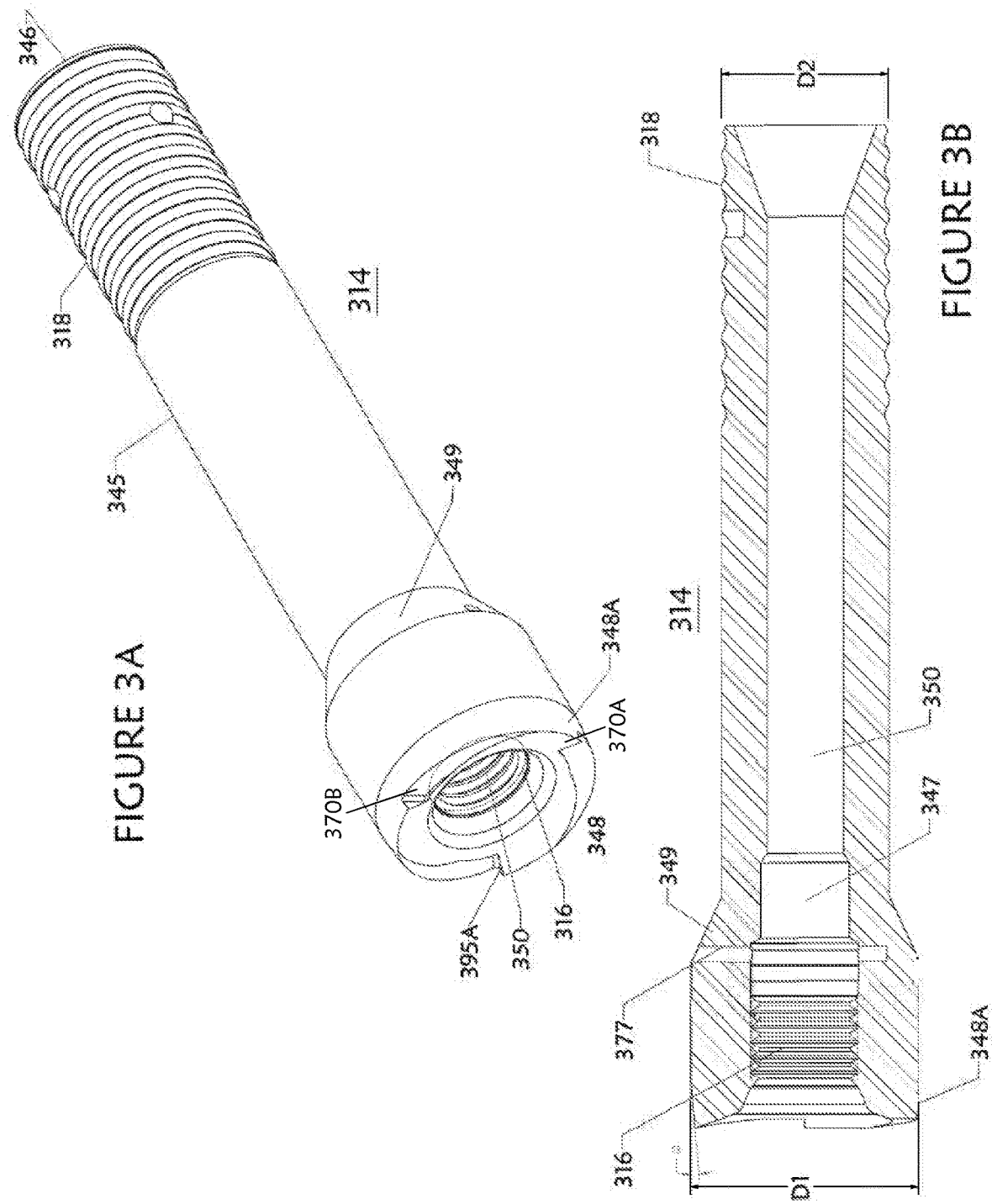

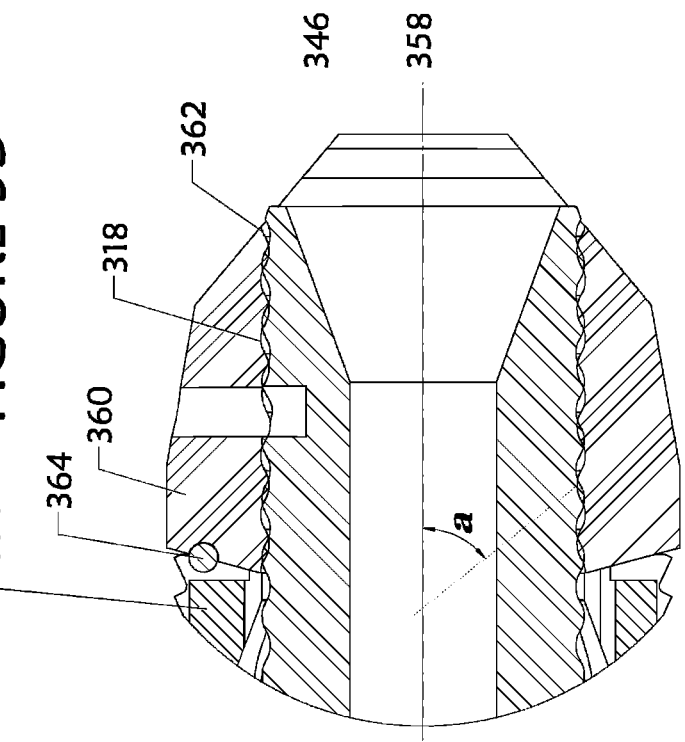
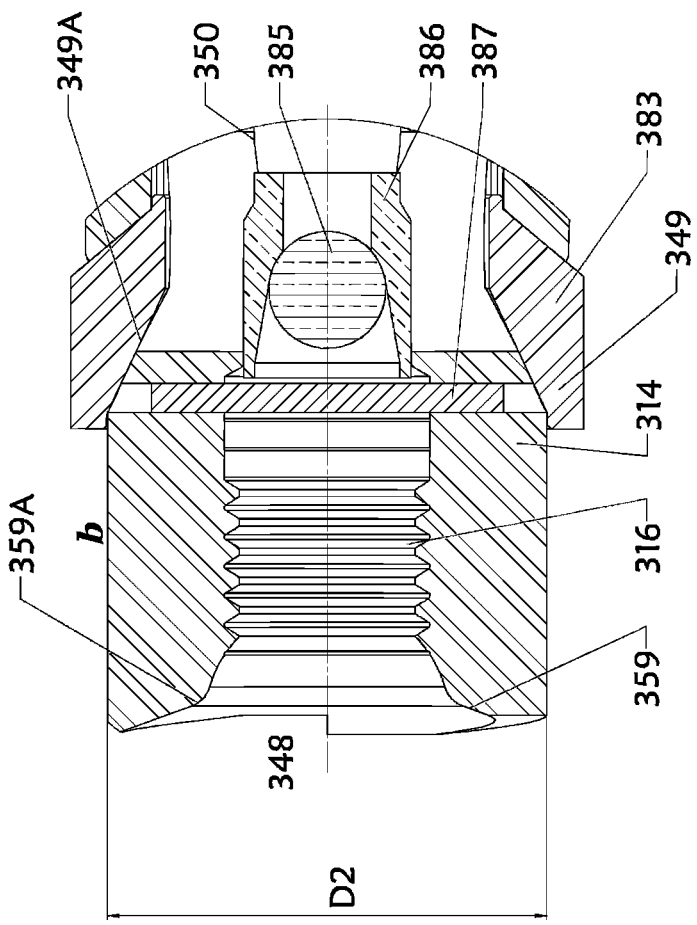
FIGURE 3C
FIGURE 3D

378

378
380

378

378
377
380
379

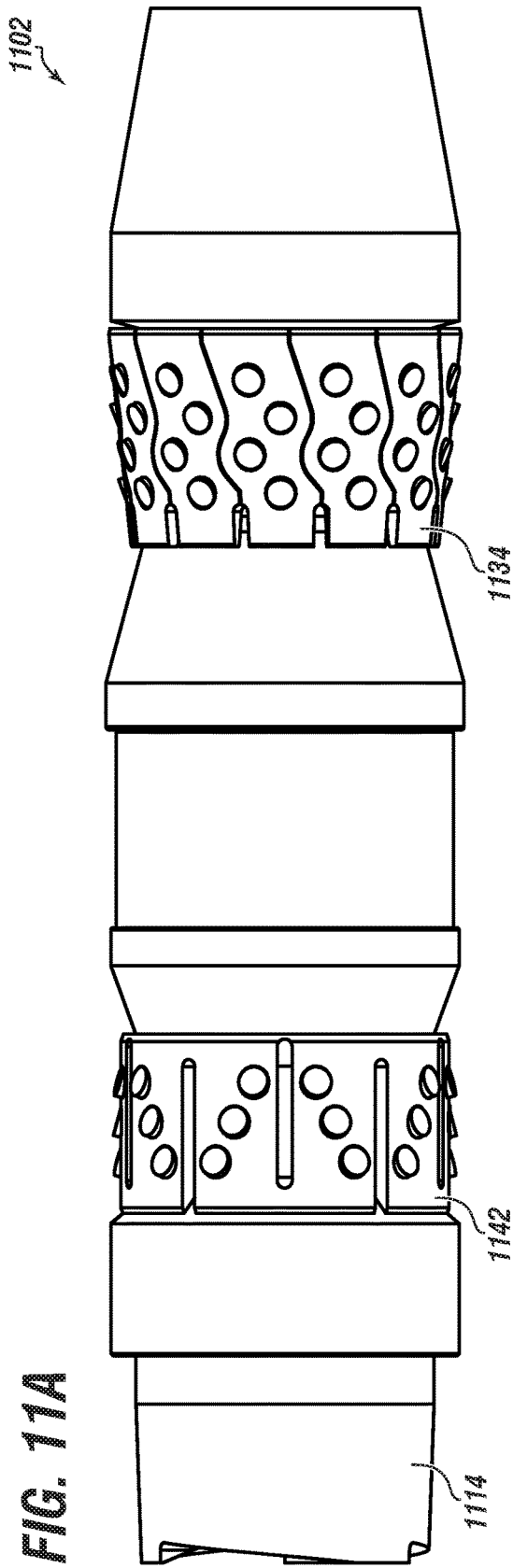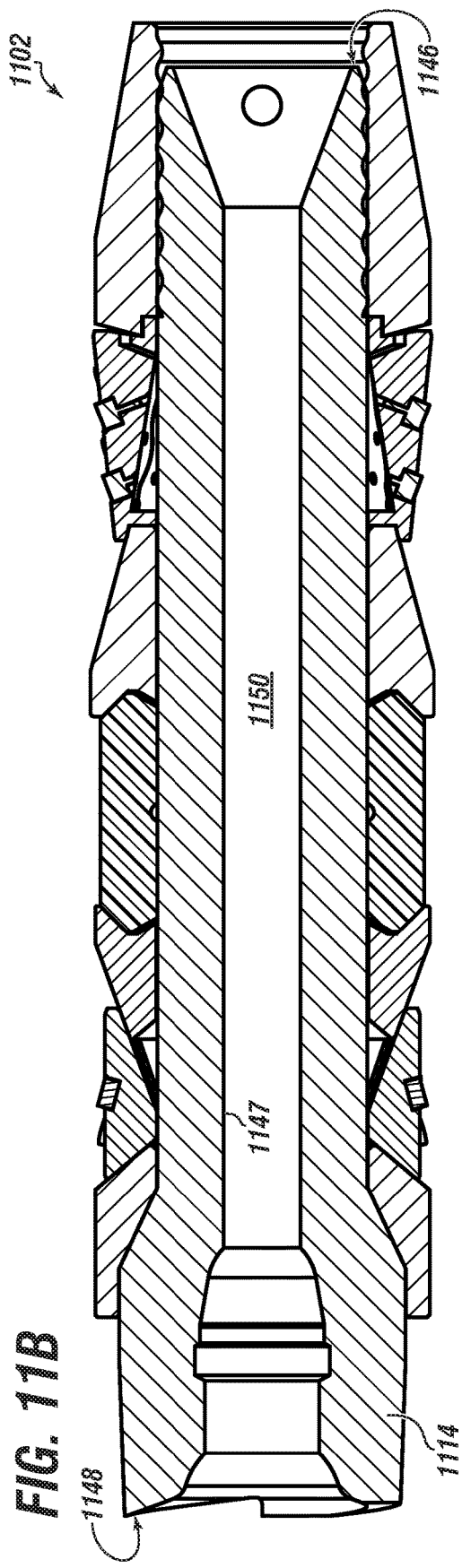

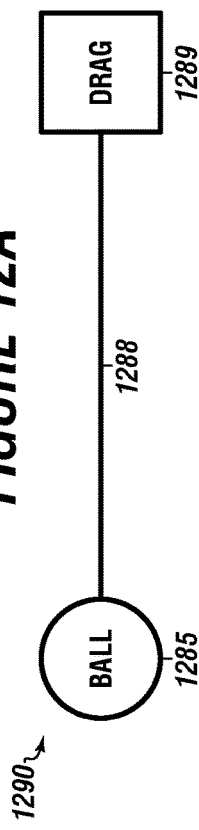
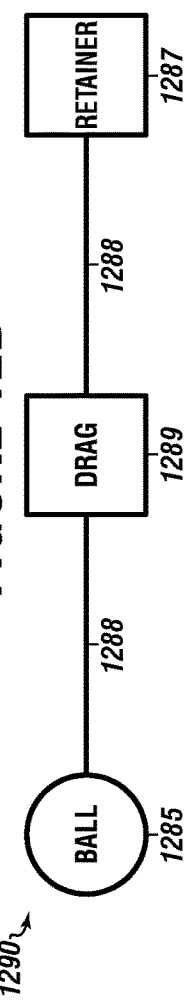
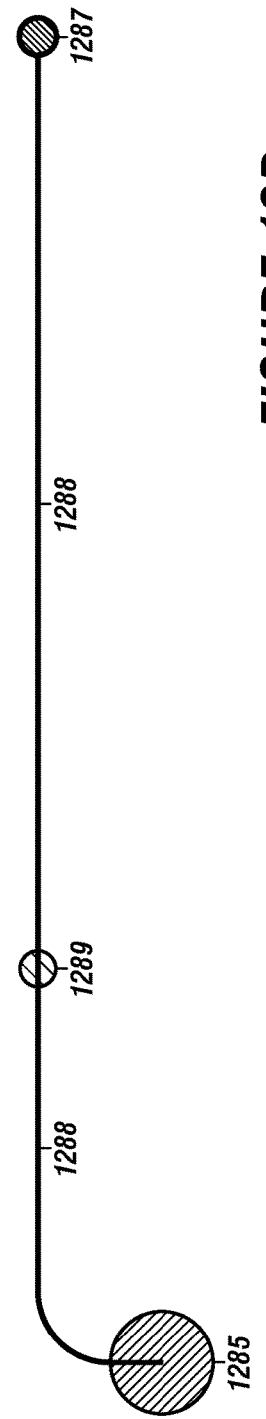
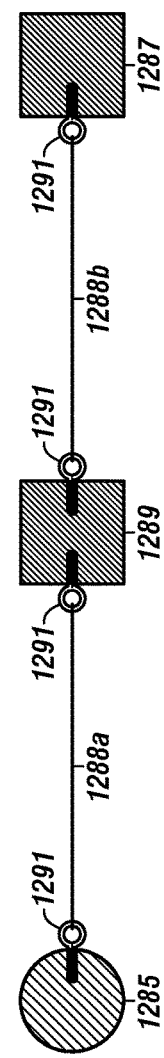

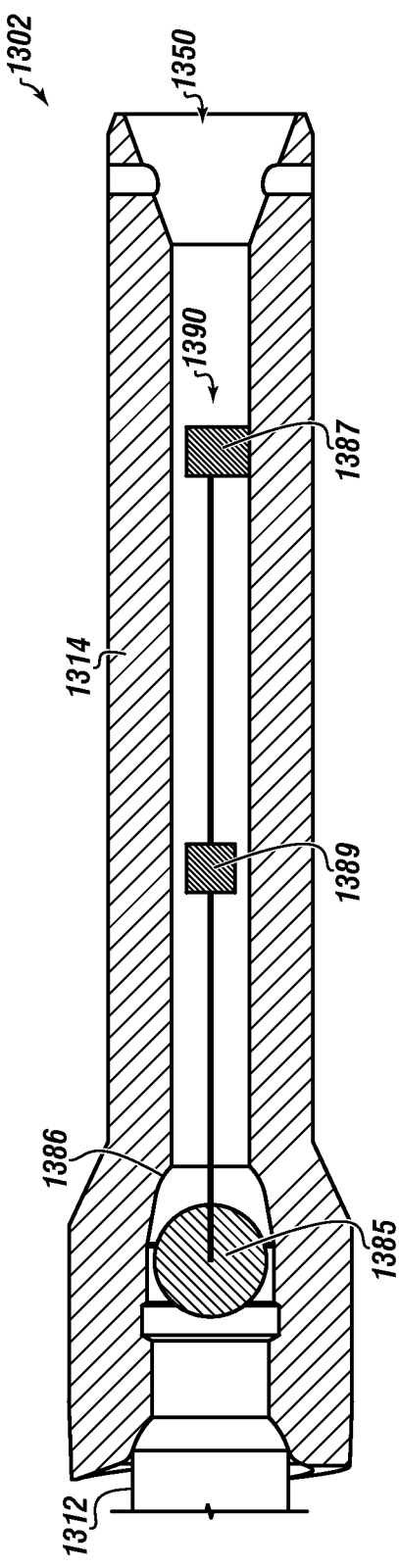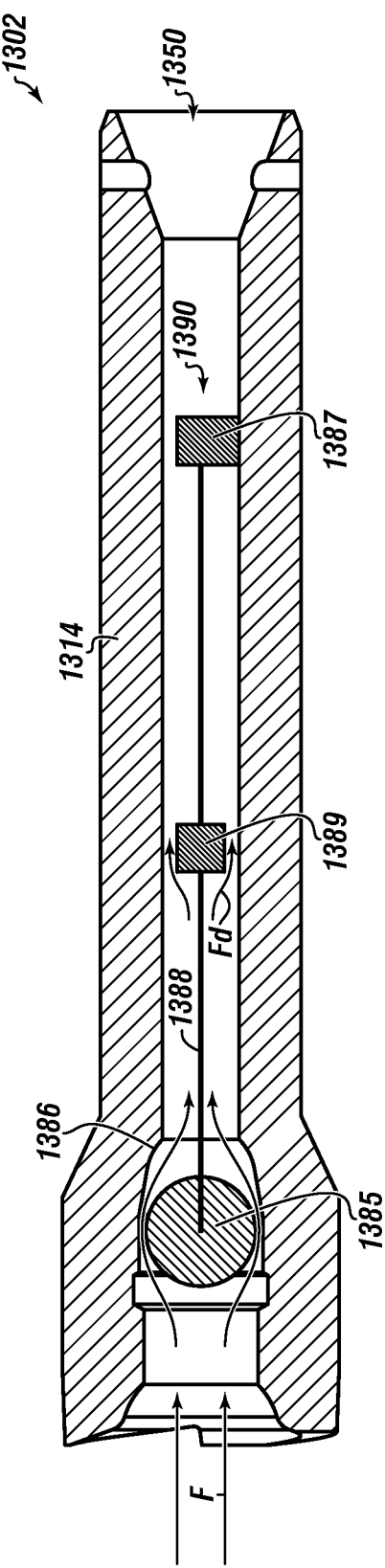

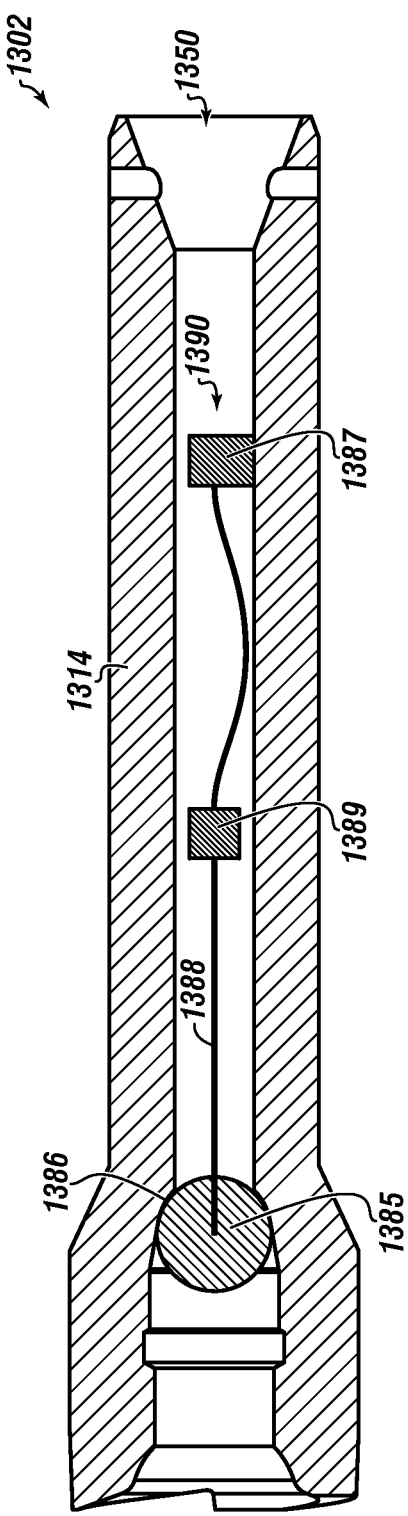
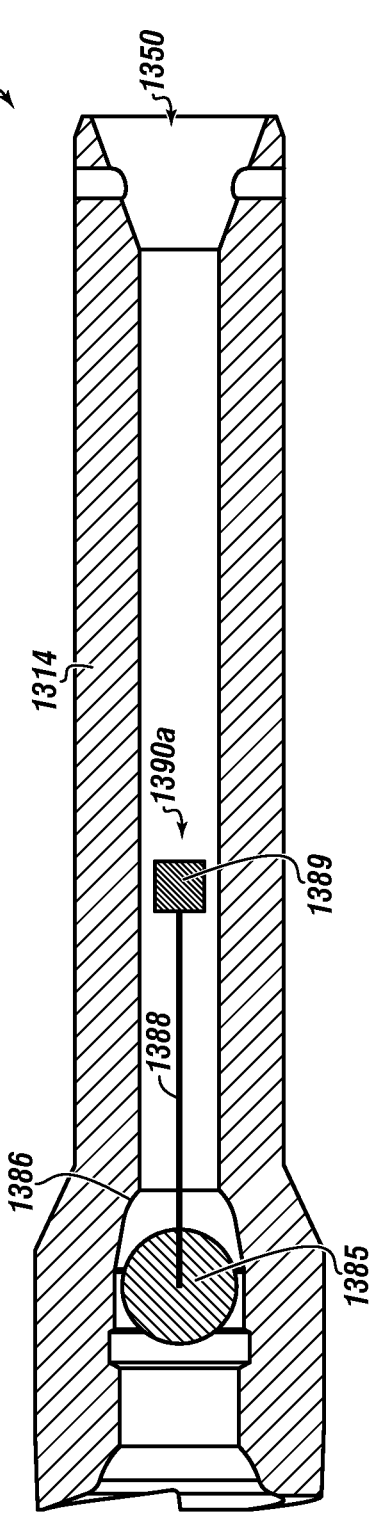
FIGURE 13C
FIGURE 13D

DOWNHOLE TOOL WITH TETHERED BALL

INCORPORATION BY REFERENCE

The subject matter of co-pending U.S. non-provisional application Ser. No. 15/876,120, filed Jan. 20, 2018, Ser. Nos. 15/898,753 and 15/899,147, each filed Feb. 19, 2018, Ser. No. 15/904,468, filed Feb. 26, 2018, and Ser. No. 16/106,114, filed Aug. 21, 2018, is incorporated herein by reference in entirety for all purposes, including with particular respect to a composition of matter (or material of construction) for a (sub)component for a downhole tool and a one piece bottom composite slip. One or more of these applications may be referred to herein as the "Applications".

STATEMENT REGARDING FEDERALLY SPONSORED RESEARCH OR DEVELOPMENT

Not applicable.

BACKGROUND

Field of the Disclosure

This disclosure generally relates to tools used in oil and gas wellbores. More specifically, the disclosure relates to downhole tools that may be run into a wellbore and useable for wellbore isolation, and systems and methods pertaining to the same. In particular embodiments, the tool may be a plug made of drillable materials and may include at least one slip having a one-piece configuration. In embodiments, the tool may have a tethered ball therein.

Background of the Disclosure

An oil or gas well includes a wellbore extending into a subterranean formation at some depth below a surface (e.g., Earth's surface), and is usually lined with a tubular, such as casing, to add strength to the well. Many commercially viable hydrocarbon sources are found in "tight" reservoirs, which means the target hydrocarbon product may not be easily extracted. The surrounding formation (e.g., shale) to these reservoirs is typically has low permeability, and it is uneconomical to produce the hydrocarbons (i.e., gas, oil, etc.) in commercial quantities from this formation without the use of drilling accompanied with fracing operations.

Fracing is now common in the industry, and has reshaped the global energy sector. and includes the use of a plug set in the wellbore below or beyond the respective target zone, followed by pumping or injecting high pressure frac fluid into the zone. A frac plug and accompanying operation may be such as described or otherwise disclosed in U.S. Pat. No. 8,955,605, incorporated by reference herein in its entirety for all purposes.

FIG. 1 illustrates a conventional plugging system 100 that includes use of a downhole tool 102 used for plugging a section of the wellbore 106 drilled into formation 110. The tool or plug 102 may be lowered into the wellbore 106 by way of workstring 105 (e.g., e-line, wireline, coiled tubing, etc.) and/or with setting tool 112, as applicable. The tool 102 generally includes a body 103 with a compressible seal member 122 to seal the tool 102 against an inner surface 107 of a surrounding tubular, such as casing 108. The tool 102 may include the seal member 122 disposed between one or more slips 109, 111 that are used to help retain the tool 102 in place.

In operation, forces (usually axial relative to the wellbore 106) are applied to the slip(s) 109, 111 and the body 103. As the setting sequence progresses, slip 109 moves in relation to the body 103 and slip 111, the seal member 122 is actuated, and the slips 109, 111 are driven against corresponding conical surfaces 104. This movement axially compresses and/or radially expands the compressible member 122, and the slips 109, 111, which results in these components being urged outward from the tool 102 to contact the inner wall 107. In this manner, the tool 102 provides a seal expected to prevent transfer of fluids from one section 113 of the wellbore across or through the tool 102 to another section 115 (or vice versa, etc.), or to the surface. Tool 102 may also include an interior passage (not shown) that allows fluid communication between section 113 and section 115 when desired by the user. Oftentimes multiple sections are isolated by way of one or more additional plugs (e.g., 102A).

Upon proper setting, the plug may be subjected to high or extreme pressure and temperature conditions, which means the plug must be capable of withstanding these conditions without destruction of the plug or the seal formed by the seal element. High temperatures are generally defined as downhole temperatures above 200° F., and high pressures are generally defined as downhole pressures above 7,500 psi, and even in excess of 15,000 psi. Extreme wellbore conditions may also include high and low pH environments. In these conditions, conventional tools, including those with compressible seal elements, may become ineffective from degradation. For example, the sealing element may melt, solidify, or otherwise lose elasticity, resulting in a loss the ability to form a seal barrier.

Because plugs are required to withstand extreme downhole conditions, they are built for durability and toughness, which often makes a drill-through process difficult. Even drillable plugs are typically constructed of some metal such as cast iron that may be drilled out with a drill bit at the end of a drill string. Steel may also be used in the structural body of the plug to provide structural strength to set the tool. The more metal parts used in the tool, the longer the drilling operation takes. Because metallic components are harder to drill through, this process may require additional trips into and out of the wellbore to replace worn out drill bits.

The use of plugs in a wellbore is not without other problems, as these tools are subject to known failure modes. When the plug is run into position, the slips have a tendency to pre-set before the plug reaches its destination, resulting in damage to the casing and operational delays. Pre-set may result, for example, because of residue or debris (e.g., sand) left from a previous frac. In addition, conventional plugs are known to provide poor sealing, not only with the casing, but also between the plug's components. For example, when the sealing element is placed under compression, its surfaces do not always seal properly with surrounding components (e.g., cones, etc.).

Downhole tools may have a ball seat for receiving a drop ball, which may be an 'in place' ball during run in (i.e., the ball is with the tool during run-in). When the tool is set and the drop ball engages the ball seat, the casing or other tubular in which the tool is set is sealed. Fluid may be pumped into the well after the drop ball engages the seat and forced into a formation above the tool. Prior to the seating of the ball, however, flow through the tool is allowed.

Another way to seal the tool is to drop a ball from the surface after the tool is set. Although the ball may ultimately reach the ball seat to perform its desired function, it takes time for the ball to reach the ball seat, and as the ball is pumped downward a substantial amount of fluid can be lost.

Fluid loss and lost time to get the ball seated can still be a problem, however, especially in deviated or horizontal wells.

Some wells are deviated to such an extent that even though the ball is run into the well with the tool, the ball can drift away from the tool as it is lowered into the well through the deviated portions thereof. In horizontal wells, or some portions that may even angle slightly upwardly, the drop ball may separate from the tool a great distance in the well. Thus, a large amount of fluid and time may yet again may ultimately be needed to get the ball moved to the ball seat. This is even more the case when the ball is of significant weight and/or density.

When a ball is seated, there is some concern over pressure imbalance through the tool, to the point that it may be desirous to equalize by removing the ball from the seat. This is especially the case with pressurized zones below the location of the set plug. But removal of the ball to equalize pressure may result in the ball getting lodged in an above-tool perforation, whereby any subsequent pumpdown will be ineffective.

Applicant has addressed significant industry needs with its commercially successful 'Boss Hog' frac plug (and related embodiments), and other improvements in downhole technology. Applicant's redesign and innovation over conventional downhole tools has resulted in running of more than 190,000 plugs without damaging casing or presets in major basins throughout the United States and Canada, and have held pressures exceeding 10,000 psi during frac stage treatments. Applicant's innovation around its plug has culminated in no less than 20 issued patents worldwide, with other patent applications yet pending.

The ability to save operational time (and those saving operational costs) leads to considerable competition in the marketplace. Achieving any ability to save time, or ultimately cost, leads to an immediate competitive advantage, so the Applicant continues to progress the art by addressing needs where they exist.

There is a need for a downhole tool that will allow for flow therethrough until the tool is set the drop ball engages the ball seat, but that can be set with a minimal amount of fluid loss and loss of time. There is a need in the art to prevent inadvertent obstruction or other problems caused by objects proximate to a set tool.

There are needs in the art for novel systems and methods for isolating wellbores in a viable and economical fashion. There is a great need in the art for downhole plugging tools that form a reliable and resilient seal against a surrounding tubular. There is also a need for a downhole tool made substantially of a drillable material that is easier and faster to drill. It is highly desirous for these downhole tools to readily and easily withstand extreme wellbore conditions, and at the same time be cheaper, smaller, lighter, and useable in the presence of high pressures associated with drilling and completion operations.

SUMMARY

Embodiments of the disclosure pertain to a method of using a downhole tool that may include one or more steps of: at a surface facility proximate to a wellbore, connecting the downhole tool with a workstring; operating the workstring to run the downhole tool into the wellbore to a desired position; setting the downhole tool; and disconnecting the downhole tool from the workstring.

Other embodiments of the disclosure pertain to a method of using a downhole tool that may include one or more steps of: connecting the downhole tool to a workstring; operating a workstring to run the downhole tool into a wellbore to a desired position; placing the mandrel under a tensile load; setting the downhole tool; and disconnecting the downhole tool from the workstring when the tensile load is of sufficient amount to cause shearing.

Embodiments of the disclosure pertain to a tethered ball assembly for a downhole tool that may include a ball; a drag; and a tether having a first portion coupled between the ball and the drag.

The assembly may include a retainer. The tether may have a second portion coupled between the retainer and the drag. There may be a second tether is coupled between the retainer and the drag.

The drag may be spherical.

The retainer may be coupled to the downhole tool. The downhole tool may be a frac plug.

Embodiments herein pertain to a downhole tool that may have a mandrel configured with a bore and a ball seat. The tool may have a tethered ball assembly associated therewith. The assembly may include a ball; a drag; and at least one tether coupled between the ball and the drag. The assembly may include a retainer.

The retainer may be coupled to the downhole tool in a manner whereby the ball is free to move off the ball seat only so far as the tether permits.

In aspects, a second tether may be coupled between the retainer and the drag.

The drag may be spherical. The downhole tool may be a frac plug. At least one component of the downhole tool and/or tethered ball assembly may be made of a reactive material.

Yet other embodiments of the disclosure pertain to a method of using a downhole tool that may include the steps of: running the downhole tool to a desire location within a tubular disposed within a subterranean formation; seating a tethered ball assembly against a ball seat of the downhole tool.

The ball assembly may include a ball; a drag; and a tether coupled between the ball and the drag.

These and other embodiments, features and advantages will be apparent in the following detailed description and drawings.

BRIEF DESCRIPTION OF THE DRAWINGS

For a more detailed description of the present invention, reference will now be made to the accompanying drawings, wherein:

FIG. 2A shows an isometric view of a system having a downhole tool, according to embodiments of the disclosure;

FIG. 2B shows an isometric view of a system having a downhole tool, according to embodiments of the disclosure;

FIG. 3A shows an isometric view of a mandrel usable with a downhole tool according to embodiments of the disclosure;

FIG. 3B shows a longitudinal cross-sectional view of a mandrel usable with a downhole tool according to embodiments of the disclosure;

FIG. 3C shows a longitudinal cross-sectional view of an end of a mandrel usable with a downhole tool according to embodiments of the disclosure;

FIG. 3D shows a longitudinal cross-sectional view of an end of a mandrel engaged with a sleeve according to embodiments of the disclosure;

FIG. 11A shows a longitudinal side view of a downhole tool with a composite one-piece bottom position slip according to embodiments of the disclosure;

FIG. 11B shows a longitudinal cross-sectional side view of the downhole tool of FIG. 11A according to embodiments of the disclosure;

FIG. 12A shows a block diagram view of a tethered ball assembly according to embodiments of the disclosure;

FIG. 12B shows a block diagram view of a tethered ball assembly with a retainer according to embodiments of the disclosure;

FIG. 12C shows a longitudinal side view of a tethered ball assembly according to embodiments of the disclosure;

FIG. 12D shows a longitudinal side view of a tethered ball assembly with one or more eyelets according to embodiments of the disclosure;

FIG. 13A shows a longitudinal side view of a downhole tool having an in-place tethered ball assembly according to embodiments of the disclosure;

FIG. 13B shows a longitudinal side view of the downhole tool of FIG. 13A set in a tubular according to embodiments of the disclosure;

FIG. 13C shows a longitudinal side view of the downhole tool of FIG. 13A set in a tubular with a ball seated on a ball seat according to embodiments of the disclosure;

FIG. 13D shows a longitudinal side view of a drop-ball tethered ball assembly according to embodiments of the disclosure;

DETAILED DESCRIPTION

Figure 1:
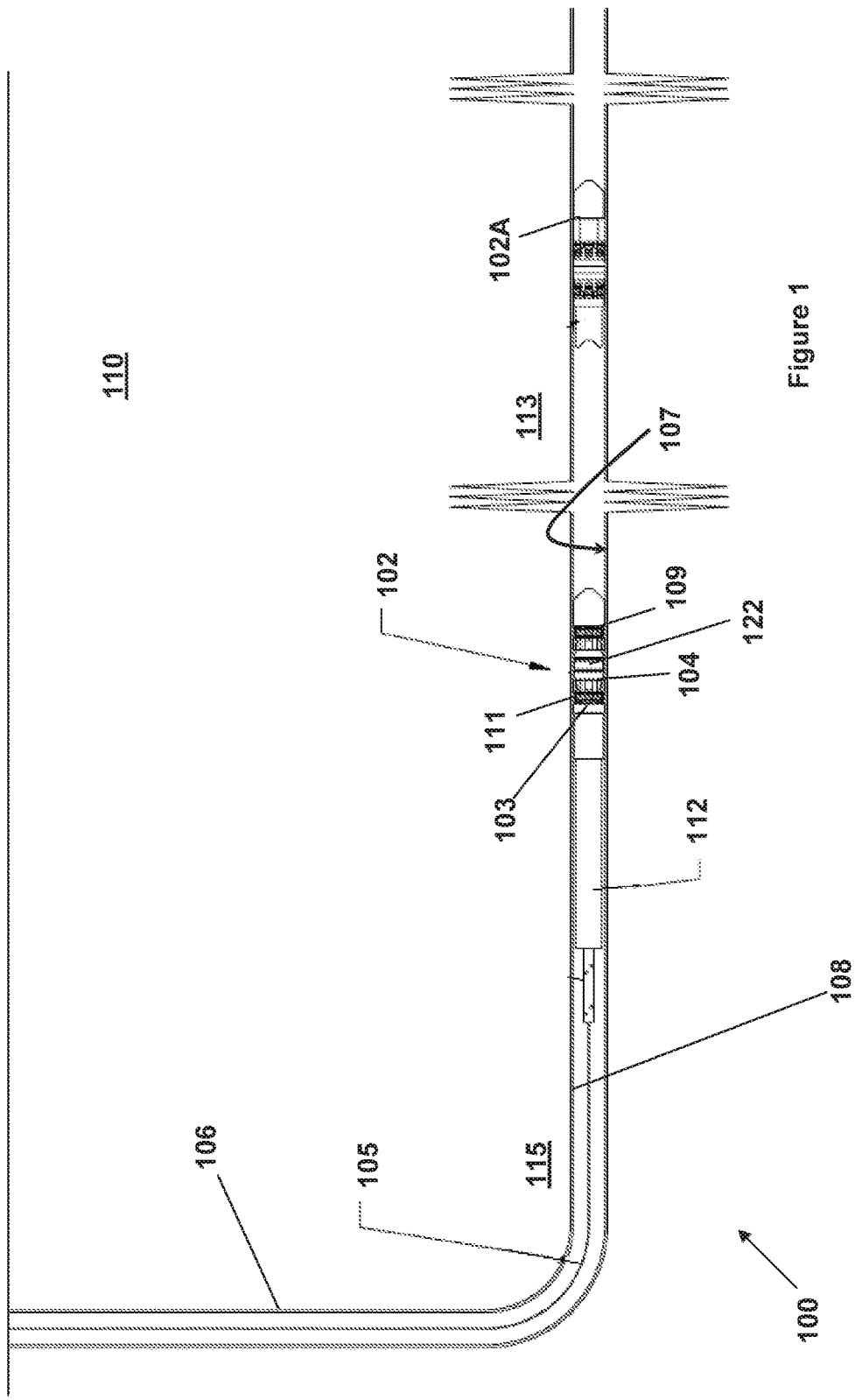
FIG. 1 is a side view of a process diagram of a conventional plugging system.

Herein disclosed are novel apparatuses, systems, and methods that pertain to downhole tools usable for wellbore operations, details of which are described herein.

Downhole tools according to embodiments disclosed herein may include one or more anchor slips, one or more compression cones engageable with the slips, and a compressible seal element disposed therebetween, all of which may be configured or disposed around a mandrel. The mandrel may include a flow bore open to an end of the tool and extending to an opposite end of the tool. In embodiments, the downhole tool may be a frac plug or a bridge plug. Thus, the downhole tool may be suitable for frac operations. In an exemplary embodiment, the downhole tool may be a composite frac plug made of drillable material, the plug being suitable for use in vertical or horizontal wellbores.

Embodiments of the present disclosure are described in detail with reference to the accompanying Figures. In the following discussion and in the claims, the terms "including" and "comprising" are used in an open-ended fashion, such as to mean, for example, "including, but not limited to . . . ". While the disclosure may be described with reference to relevant apparatuses, systems, and methods, it should be understood that the disclosure is not limited to the specific embodiments shown or described. Rather, one skilled in the art will appreciate that a variety of configurations may be implemented in accordance with embodiments herein.

Although not necessary, like elements in the various figures may be denoted by like reference numerals for consistency and ease of understanding. Numerous specific details are set forth in order to provide a more thorough understanding of the disclosure; however, it will be apparent to one of ordinary skill in the art that the embodiments disclosed herein may be practiced without these specific details. In other instances, well-known features have not been described in detail to avoid unnecessarily complicating the description. Directional terms, such as "above," "below," "upper," "lower," "front," "back," etc., are used for convenience and to refer to general direction and/or orientation, and are only intended for illustrative purposes only, and not to limit the disclosure.

Connection(s), couplings, or other forms of contact between parts, components, and so forth may include conventional items, such as lubricant, additional sealing materials, such as a gasket between flanges, PTFE between threads, and the like. The make and manufacture of any particular component, subcomponent, etc., may be as would be apparent to one of skill in the art, such as molding, forming, press extrusion, machining, or additive manufacturing. Embodiments of the disclosure provide for one or more components to be new, used, and/or retrofitted.

Numerical ranges in this disclosure may be approximate, and thus may include values outside of the range unless otherwise indicated. Numerical ranges include all values from and including the expressed lower and the upper values, in increments of smaller units. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. It is intended that decimals or fractions thereof be included. For ranges containing values which are less than one or containing fractional numbers greater than one (e.g., 1.1, 1.5, etc.), smaller units may be considered to be 0.0001, 0.001, 0.01, 0.1, etc. as appropriate. These are only examples of what is specifically intended, and all possible combinations of numerical values between the lowest value and the highest value enumerated, are to be considered to be expressly stated in this disclosure.

Terms

Composition of matter: as used herein may refer to one or more ingredients or constituents that make up a material (or material of construction). For example, a material may have a composition of matter. Similarly, a device may be made of a material having a composition of matter. The composition of matter may be derived from an initial composition.

Reactive Material: as used herein may refer a material with a composition of matter having properties and/or characteristics that result in the material responding to a change over time and/or under certain conditions. The term reactive material may encompass degradable, dissolvable, disassociatable, and so on.

Degradable Material: as used herein may refer to a composition of matter having properties and/or characteristics that, while subject to change over time and/or under certain conditions, lead to a change in the integrity of the material. As one example, the material may initially be hard, rigid, and strong at ambient or surface conditions, but over time (such as within about 12-36 hours) and under certain conditions (such as wellbore conditions), the material softens.

Dissolvable Material: analogous to degradable material; as used herein may refer to a composition of matter having properties and/or characteristics that, while subject to change over time and/or under certain conditions, lead to a change in the integrity of the material, including to the point of degrading, or partial or complete dissolution. As one example, the material may initially be hard, rigid, and strong at ambient or surface conditions, but over time (such as within about 12-36 hours) and under certain conditions (such as wellbore conditions), the material softens. As another example, the material may initially be hard, rigid, and strong at ambient or surface conditions, but over time (such as within about 12-36 hours) and under certain conditions (such as wellbore conditions), the material dissolves at least partially, and may dissolve completely. The material may dissolve via one or more mechanisms, such as oxidation, reduction, deterioration, go into solution, or otherwise lose sufficient mass and structural integrity.

Breakable Material: as used herein may refer to a composition of matter having properties and/or characteristics that, while subject to change over time and/or under certain conditions, lead to brittleness. As one example, the material may be hard, rigid, and strong at ambient or surface conditions, but over time and under certain conditions, becomes brittle. The breakable material may experience breakage into multiple pieces, but not necessarily dissolution.

Disassociatable Material: as used herein may refer to a composition of matter having properties and/or characteristics that, while subject to change over time and/or under certain conditions, lead to a change in the integrity of the material, including to the point of changing from a solid structure to a powdered material. As one example, the material may initially be hard, rigid, and strong at ambient or surface conditions, but over time (such as within about 12-36 hours) and under certain conditions (such as wellbore conditions), the material changes (disassociates) to a powder.

For some embodiments, a material of construction may include a composition of matter designed or otherwise having the inherent characteristic to react or change integrity or other physical attribute when exposed to certain wellbore conditions, such as a change in time, temperature, water, heat, pressure, solution, combinations thereof, etc. Heat may be present due to the temperature increase attributed to the natural temperature gradient of the earth, and water may already be present in existing wellbore fluids. The change in integrity may occur in a predetermined time period, which may vary from several minutes to several weeks. In aspects, the time period may be about 12 to about 36 hours.

The term "fracing" as used herein can refer to fractionation of a downhole well that has already been drilled. 'Fracing' can also be referred to and interchangeable with the terms facing operation, fractionation, hydrofracturing, hydrofracking, fracking, frac, and so on. A frac operation can be land or water based.

Referring now to FIGS. 2A and 2B together, isometric views of a system 200 having a downhole tool 202 illustrative of embodiments disclosed herein, are shown. FIG. 2B depicts a wellbore 206 formed in a subterranean formation 210 with a tubular 208 disposed therein. In an embodiment, the tubular 208 may be casing (e.g., casing, hung casing, casing string, etc.) (which may be cemented). A workstring 212 (which may include a part 217 of a setting tool coupled with adapter 252) may be used to position or run the downhole tool 202 into and through the wellbore 206 to a desired location.

In accordance with embodiments of the disclosure, the tool 202 may be configured as a plugging tool, which may be set within the tubular 208 in such a manner that the tool 202 forms a fluid-tight seal against the inner surface 207 of the tubular 208. In an embodiment, the downhole tool 202 may be configured as a bridge plug, whereby flow from one section of the wellbore 213 to another (e.g., above and below the tool 202) is controlled. In other embodiments, the downhole tool 202 may be configured as a frac plug, where flow into one section 213 of the wellbore 206 may be blocked and otherwise diverted into the surrounding formation or reservoir 210.

In yet other embodiments, the downhole tool 202 may also be configured as a ball drop tool. In this aspect, a ball may be dropped into the wellbore 206 and flowed into the tool 202 and come to rest in a corresponding ball seat at the end of the mandrel 214. The seating of the ball may provide a seal within the tool 202 resulting in a plugged condition, whereby a pressure differential across the tool 202 may result. The ball seat may include a radius or curvature.

In other embodiments, the downhole tool 202 may be a ball check plug, whereby the tool 202 is configured with a ball already in place when the tool 202 runs into the wellbore. The tool 202 may then act as a check valve, and provide one-way flow capability. Fluid may be directed from the wellbore 206 to the formation with any of these configurations.

Once the tool 202 reaches the set position within the tubular, the setting mechanism or workstring 212 may be detached from the tool 202 by various methods, resulting in the tool 202 left in the surrounding tubular and one or more sections of the wellbore isolated. In an embodiment, once the tool 202 is set, tension may be applied to the adapter 252 until the threaded connection between the adapter 252 and the mandrel 214 is broken. For example, the mating threads on the adapter 252 and the mandrel 214 (256 and 216, respectively as shown in FIG. 2D) may be designed to shear, and thus may be pulled and sheared accordingly in a manner known in the art. The amount of load applied to the adapter 252 may be in the range of about, for example, 20,000 to 40,000 pounds force. In other applications, the load may be in the range of less than about 10,000 pounds force.

Accordingly, the adapter 252 may separate or detach from the mandrel 214, resulting in the workstring 212 being able to separate from the tool 202, which may be at a predetermined moment. The loads provided herein are non-limiting and are merely exemplary. The setting force may be determined by specifically designing the interacting surfaces of the tool and the respective tool surface angles. The tool may 202 also be configured with a predetermined failure point (not shown) configured to fail or break. For example, the failure point may break at a predetermined axial force greater than the force required to set the tool but less than the force required to part the body of the tool.

Operation of the downhole tool 202 may allow for fast run in of the tool 202 to isolate one or more sections of the wellbore 206, as well as quick and simple drill-through to destroy or remove the tool 202. Drill-through of the tool 202 may be facilitated by components and sub-components of tool 202 made of drillable material that is less damaging to a drill bit than those found in conventional plugs.

The downhole tool 202 may have one or more components made of a material as described herein and in accordance with embodiments of the disclosure. In an embodiment, the downhole tool 202 and/or its components may be a drillable tool made from drillable composite material(s), such as glass fiber/epoxy, carbon fiber/epoxy, glass fiber/PEEK, carbon fiber/PEEK, etc. Other resins may include phenolic, polyamide, etc. All mating surfaces of the downhole tool 202 may be configured with an angle, such that corresponding components may be placed under compression instead of shear.

The downhole tool 202 may have one or more components made of non-composite material, such as a metal or metal alloys. The downhole tool 202 may have one or more components made of a reactive material (e.g., dissolvable, degradable, etc.).

In embodiments, one or more components may be made of a metallic material, such as an aluminum-based or magnesium-based material. The metallic material may be reactive, such as dissolvable, which is to say under certain conditions the respective component(s) may begin to dissolve, and thus alleviating the need for drill thru. In embodiments, the components of the tool 202 may be made of dissolvable aluminum-, magnesium-, or aluminum-magnesium-based (or alloy, complex, etc.) material, such as that provided by Nanjing Highsur Composite Materials Technology Co. LTD.

One or more components of tool 202 may be made of non-dissolvable materials (e.g., materials suitable for and are known to withstand downhole environments [including extreme pressure, temperature, fluid properties, etc.] for an extended period of time (predetermined or otherwise) as may be desired).

Just the same, one or more components of a tool of embodiments disclosed herein may be made of reactive materials (e.g., materials suitable for and are known to dissolve, degrade, etc. in downhole environments [including extreme pressure, temperature, fluid properties, etc.] after a brief or limited period of time (predetermined or otherwise) as may be desired). In an embodiment, a component made of a reactive material may begin to react within about 3 to about 48 hours after setting of the downhole tool 202.

The downhole tool 202 (and other tool embodiments disclosed herein) and/or one or more of its components may be 3D printed as would be apparent to one of skill in the art, such as via one or more methods or processes described in U.S. Pat. Nos. 6,353,771; 5,204,055; 7,087,109; 7,141,207; and 5,147,587. See also information available at the websites of Z Corporation (www.zcorp.com); Prometal (www.prometal.com); EOS GmbH (www.eos.info); and 3D Systems, Inc. (www.3dsystems.com); and Stratasys, Inc. (www.stratasys.com and www.dimensionprinting.com) (applicable to all embodiments).

Figure 2C:
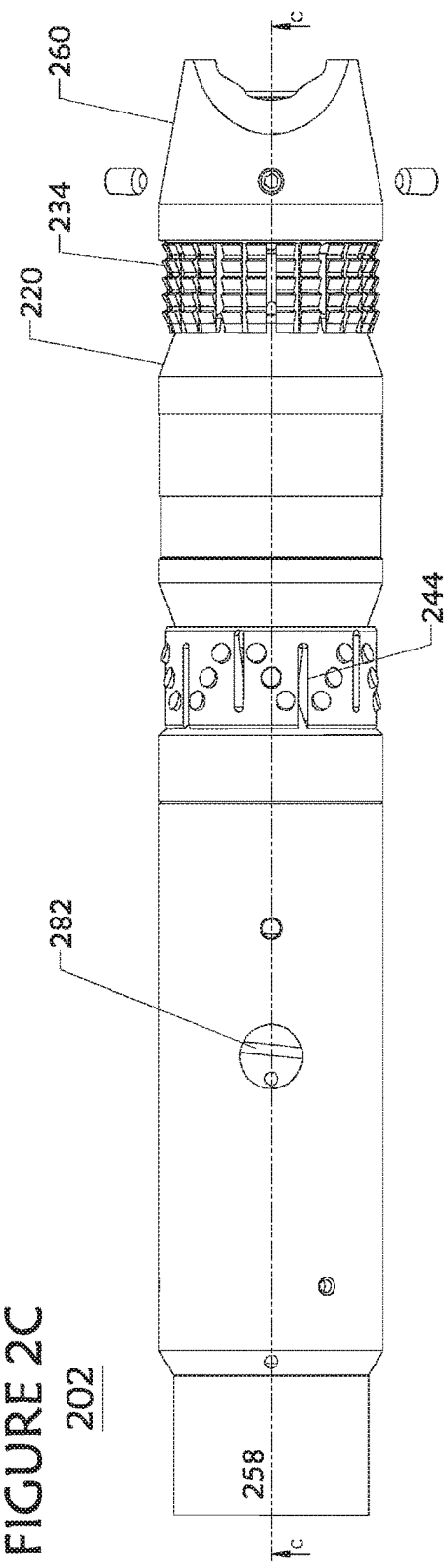
FIG. 2C shows a side longitudinal view of a downhole tool according to embodiments of the disclosure.
Figure 2D:
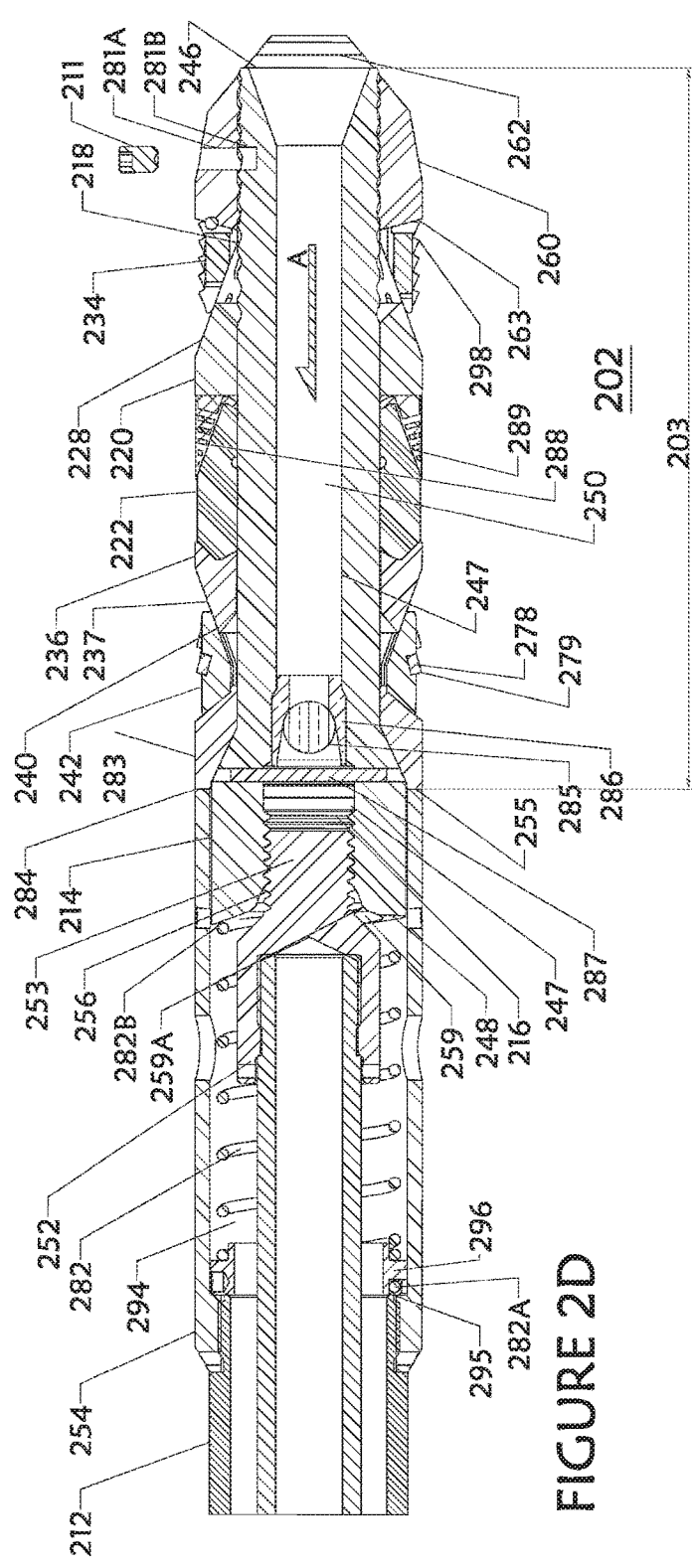
FIG. 2D shows a longitudinal cross-sectional view of a downhole tool according to embodiments of the disclosure.
Figure 2E:
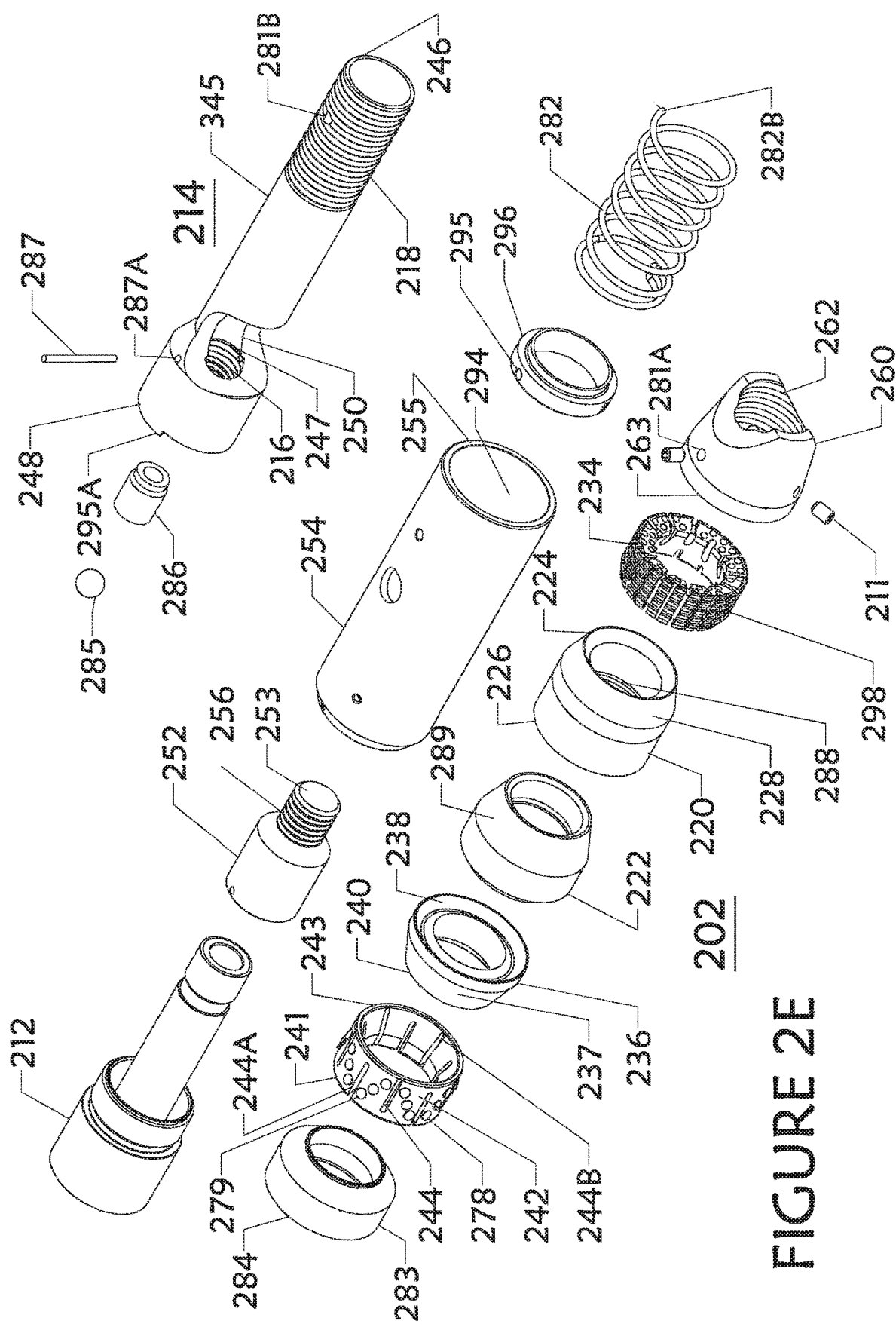
FIG. 2E shows an isometric component break-out view of a downhole tool according to embodiments of the disclosure.

Referring now to FIGS. 2C-2E together, a longitudinal view, a longitudinal cross-sectional view, and an isometric component break-out view, respectively, of downhole tool 202 useable with system (200, FIG. 2A) and illustrative of embodiments disclosed herein, are shown. The downhole tool 202 may include a mandrel 214 that extends through the tool (or tool body) 202. The mandrel 214 may be a solid body. In other aspects, the mandrel 214 may include a flowpath or bore 250 formed therein (e.g., an axial bore). The bore 250 may extend partially or for a short distance through the mandrel 214, as shown in FIG. 2E. Alternatively, the bore 250 may extend through the entire mandrel 214, with an opening at its proximate end 248 and oppositely at its distal end 246 (near downhole end of the tool 202), as illustrated by FIG. 2D.

The presence of the bore 250 or other flowpath through the mandrel 214 may indirectly be dictated by operating conditions. That is, in most instances the tool 202 may be large enough in diameter (e.g., 4¾ inches) that the bore 250 may be correspondingly large enough (e.g., 1¼ inches) so that debris and junk can pass or flow through the bore 250 without plugging concerns. However, with the use of a smaller diameter tool 202, the size of the bore 250 may need to be correspondingly smaller, which may result in the tool 202 being prone to plugging. Accordingly, the mandrel may be made solid to alleviate the potential of plugging within the tool 202.

With the presence of the bore 250, the mandrel 214 may have an inner bore surface 247, which may include one or more threaded surfaces formed thereon. As such, there may be a first set of threads 216 configured for coupling the mandrel 214 with corresponding threads 256 of a setting adapter 252.

The coupling of the threads, which may be shear threads, may facilitate detachable connection of the tool 202 and the setting adapter 252 and/or workstring (212, FIG. 2B) at a the threads. It is within the scope of the disclosure that the tool 202 may also have one or more predetermined failure points (not shown) configured to fail or break separately from any threaded connection. The failure point may fail or shear at a predetermined axial force greater than the force required to set the tool 202.

The adapter 252 may include a stud 253 configured with the threads 256 thereon. In an embodiment, the stud 253 has external (male) threads 256 and the mandrel 214 has internal (female) threads; however, type or configuration of threads is not meant to be limited, and could be, for example, a vice versa female-male connection, respectively.

The downhole tool 202 may be run into wellbore (206, FIG. 2A) to a desired depth or position by way of the workstring (212, FIG. 2A) that may be configured with the setting device or mechanism. The workstring 212 and setting sleeve 254 may be part of the plugging tool system 200 utilized to run the downhole tool 202 into the wellbore, and activate the tool 202 to move from an unset to set position. The set position may include seal element 222 and/or slips 234, 242 engaged with the tubular (208, FIG. 2B). In an embodiment, the setting sleeve 254 (that may be configured as part of the setting mechanism or workstring) may be utilized to force or urge compression of the seal element 222, as well as swelling of the seal element 222 into sealing engagement with the surrounding tubular.

The setting device(s) and components of the downhole tool 202 may be coupled with, and axially and/or longitudinally movable along mandrel 214. When the setting sequence begins, the mandrel 214 may be pulled into tension while the setting sleeve 254 remains stationary. The lower sleeve 260 may be pulled as well because of its attachment to the mandrel 214 by virtue of the coupling of threads 218 and threads 262. As shown in the embodiment of FIGS. 2C and 2D, the lower sleeve 260 and the mandrel 214 may have matched or aligned holes 281A and 281B, respectively, whereby one or more anchor pins 211 or the like may be disposed or securely positioned therein. In embodiments, brass set screws may be used. Pins (or screws, etc.) 211 may prevent shearing or spin-off during drilling or run-in.

As the lower sleeve 260 is pulled in the direction of Arrow A, the components disposed about mandrel 214 between the lower sleeve 260 and the setting sleeve 254 may begin to compress against one another. This force and resultant movement causes compression and expansion of seal element 222. The lower sleeve 260 may also have an angled sleeve end 263 in engagement with the slip 234, and as the lower sleeve 260 is pulled further in the direction of Arrow A, the end 263 compresses against the slip 234. As a result, slip(s) 234 may move along a tapered or angled surface 228 of a composite member 220, and eventually radially outward into engagement with the surrounding tubular (208, FIG. 2B).

Serrated outer surfaces or teeth 298 of the slip(s) 234 may be configured such that the surfaces 298 prevent the slip 234 (or tool) from moving (e.g., axially or longitudinally) within the surrounding tubular, whereas otherwise the tool 202 may inadvertently release or move from its position. Although slip 234 is illustrated with teeth 298, it is within the scope of the disclosure that slip 234 may be configured with other gripping features, such as buttons or inserts (e.g., FIGS. 10A-10D).

Initially, the seal element 222 may swell into contact with the tubular, followed by further tension in the tool 202 that may result in the seal element 222 and composite member 220 being compressed together, such that surface 289 acts on the interior surface 288. The ability to "flower", unwind, and/or expand may allow the composite member 220 to extend completely into engagement with the inner surface of the surrounding tubular.

Additional tension or load may be applied to the tool 202 that results in movement of cone 236, which may be disposed around the mandrel 214 in a manner with at least one surface 237 angled (or sloped, tapered, etc.) inwardly of second slip 242. The second slip 242 may reside adjacent or proximate to collar or cone 236. As such, the seal element 222 forces the cone 236 against the slip 242, moving the slip 242 radially outwardly into contact or gripping engagement with the tubular. Accordingly, the one or more slips 234, 242 may be urged radially outward and into engagement with the tubular (208, FIG. 2B). In an embodiment, cone 236 may be slidingly engaged and disposed around the mandrel 214. As shown, the first slip 234 may be at or near distal end 246, and the second slip 242 may be disposed around the mandrel 214 at or near the proximate end 248. It is within the scope of the disclosure that the position of the slips 234 and 242 may be interchanged. Moreover, slip 234 may be interchanged with a slip comparable to slip 242, and vice versa.

Because the sleeve 254 is held rigidly in place, the sleeve 254 may engage against a bearing plate 283 that may result in the transfer load through the rest of the tool 202. The setting sleeve 254 may have a sleeve end 255 that abuts against the bearing plate end 284. As tension increases through the tool 202, an end of the cone 236, such as second end 240, compresses against slip 242, which may be held in place by the bearing plate 283. As a result of cone 236 having freedom of movement and its conical surface 237, the cone 236 may move to the underside beneath the slip 242, forcing the slip 242 outward and into engagement with the surrounding tubular (208, FIG. 2B).

The second slip 242 may include one or more, gripping elements, such as buttons or inserts 278, which may be configured to provide additional grip with the tubular. The inserts 278 may have an edge or corner 279 suitable to provide additional bite into the tubular surface. In an embodiment, the inserts 278 may be mild steel, such as 1018 heat treated steel. The use of mild steel may result in reduced or eliminated casing damage from slip engagement and reduced drill string and equipment damage from abrasion.

In an embodiment, slip 242 may be a one-piece slip, whereby the slip 242 has at least partial connectivity across its entire circumference. Meaning, while the slip 242 itself may have one or more grooves (or undulation, notch, etc.) 244 configured therein, the slip 242 itself has no initial circumferential separation point. In an embodiment, the grooves 244 may be equidistantly spaced or disposed in the second slip 242. In other embodiments, the grooves 244 may have an alternatingly arranged configuration. That is, one groove 244A may be proximate to slip end 241, the next groove 244B may be proximate to an opposite slip end 243, and so forth.

The tool 202 may be configured with ball plug check valve assembly that includes a ball seat 286. The assembly may be removable or integrally formed therein. In an embodiment, the bore 250 of the mandrel 214 may be configured with the ball seat 286 formed or removably disposed therein. In some embodiments, the ball seat 286 may be integrally formed within the bore 250 of the mandrel 214. In other embodiments, the ball seat 286 may be separately or optionally installed within the mandrel 214, as may be desired.

The ball seat 286 may be configured in a manner so that a ball 285 seats or rests therein, whereby the flowpath through the mandrel 214 may be closed off (e.g., flow through the bore 250 is restricted or controlled by the presence of the ball 285). For example, fluid flow from one direction may urge and hold the ball 285 against the seat 286, whereas fluid flow from the opposite direction may urge the ball 285 off or away from the seat 286. As such, the ball 285 and the check valve assembly may be used to prevent or otherwise control fluid flow through the tool 202. The ball 285 may be conventionally made of a composite material, phenolic resin, etc., whereby the ball 285 may be capable of holding maximum pressures experienced during downhole operations (e.g., fracing). By utilization of retainer pin 287, the ball 285 and ball seat 286 may be configured as a retained ball plug. As such, the ball 285 may be adapted to serve as a check valve by sealing pressure from one direction, but allowing fluids to pass in the opposite direction.

The tool 202 may be configured as a drop ball plug, such that a drop ball may be flowed to a drop ball seat 259. The drop ball may be much larger diameter than the ball of the ball check. In an embodiment, end 248 may be configured with a drop ball seat surface 259 such that the drop ball may come to rest and seat at in the seat proximate end 248. As applicable, the drop ball (not shown here) may be lowered into the wellbore (206, FIG. 2A) and flowed toward the drop ball seat 259 formed within the tool 202. The ball seat may be formed with a radius 259A (i.e., circumferential rounded edge or surface).

In other aspects, the tool 202 may be configured as a bridge plug, which once set in the wellbore, may prevent or allow flow in either direction (e.g., upwardly/downwardly, etc.) through tool 202. Accordingly, it should be apparent to one of skill in the art that the tool 202 of the present disclosure may be configurable as a frac plug, a drop ball plug, bridge plug, etc. simply by utilizing one of a plurality of adapters or other optional components. In any configuration, once the tool 202 is properly set, fluid pressure may be increased in the wellbore, such that further downhole operations, such as fracture in a target zone, may commence.

The tool 202 may include an anti-rotation assembly that includes an anti-rotation device or mechanism 282, which may be a spring, a mechanically spring-energized composite tubular member, and so forth. The device 282 may be configured and usable for the prevention of undesired or inadvertent movement or unwinding of the tool 202 components. As shown, the device 282 may reside in cavity 294 of the sleeve (or housing) 254. During assembly the device 282 may be held in place with the use of a lock ring 296. In other aspects, pins may be used to hold the device 282 in place.

FIG. 2D shows the lock ring 296 may be disposed around a part 217 of a setting tool coupled with the workstring 212. The lock ring 296 may be securely held in place with screws inserted through the sleeve 254. The lock ring 296 may include a guide hole or groove 295, whereby an end 282A of the device 282 may slidingly engage therewith. Protrusions or dogs 295A may be configured such that during assembly, the mandrel 214 and respective tool components may ratchet and rotate in one direction against the device 282; however, the engagement of the protrusions 295A with device end 282B may prevent back-up or loosening in the opposite direction.

The anti-rotation mechanism may provide additional safety for the tool and operators in the sense it may help prevent inoperability of tool in situations where the tool is inadvertently used in the wrong application. For example, if the tool is used in the wrong temperature application, components of the tool may be prone to melt, whereby the device 282 and lock ring 296 may aid in keeping the rest of the tool together. As such, the device 282 may prevent tool components from loosening and/or unscrewing, as well as prevent tool 202 unscrewing or falling off the workstring 212.

Drill-through of the tool 202 may be facilitated by the fact that the mandrel 214, the slips 234, 242, the cone(s) 236, the composite member 220, etc. may be made of drillable material that is less damaging to a drill bit than those found in conventional plugs. The drill bit will continue to move through the tool 202 until the downhole slip 234 and/or 242 are drilled sufficiently that such slip loses its engagement with the well bore. When that occurs, the remainder of the tools, which generally would include lower sleeve 260 and any portion of mandrel 214 within the lower sleeve 260 falls into the well. If additional tool(s) 202 exist in the well bore beneath the tool 202 that is being drilled through, then the falling away portion will rest atop the tool 202 located further in the well bore and will be drilled through in connection with the drill through operations related to the tool 202 located further in the well bore. Accordingly, the tool 202 may be sufficiently removed, which may result in opening the tubular 208.

The tool 202 may include a tethered ball and drag assembly as set forth herein.

Referring now to FIGS. 3A, 3B, 3C and 3D together, an isometric view and a longitudinal cross-sectional view of a mandrel usable with a downhole tool, a longitudinal cross-sectional view of an end of a mandrel, and a longitudinal cross-sectional view of an end of a mandrel engaged with a sleeve, in accordance with embodiments disclosed herein, are shown. Components of the downhole tool may be arranged and disposed about the mandrel 314, as described and understood to one of skill in the art. The mandrel 314, which may be made from filament wound drillable material, may have a distal end 346 and a proximate end 348. The filament wound material may be made of various angles as desired to increase strength of the mandrel 314 in axial and radial directions. The presence of the mandrel 314 may provide the tool with the ability to hold pressure and linear forces during setting or plugging operations.

The mandrel 314 may be sufficient in length, such that the mandrel may extend through a length of tool (or tool body) (202, FIG. 2B). The mandrel 314 may be a solid body. In other aspects, the mandrel 314 may include a flowpath or bore 350 formed therethrough (e.g., an axial bore). There may be a flowpath or bore 350, for example an axial bore, that extends through the entire mandrel 314, with openings at both the proximate end 348 and oppositely at its distal end 346. Accordingly, the mandrel 314 may have an inner bore surface 347, which may include one or more threaded surfaces formed thereon.

The ends 346, 348 of the mandrel 314 may include internal or external (or both) threaded portions. As shown in FIG. 3C, the mandrel 314 may have internal threads 316 within the bore 350 configured to receive a mechanical or wireline setting tool, adapter, etc. (not shown here). For example, there may be a first set of threads 316 configured for coupling the mandrel 314 with corresponding threads of another component (e.g., adapter 252, FIG. 2B). In an embodiment, the first set of threads 316 are shear threads. In an embodiment, application of a load to the mandrel 314 may be sufficient enough to shear the first set of threads 316. Although not necessary, the use of shear threads may eliminate the need for a separate shear ring or pin, and may provide for shearing the mandrel 314 from the workstring.

The proximate end 348 may include an outer taper 348A. The outer taper 348A may help prevent the tool from getting stuck or binding. For example, during setting the use of a smaller tool may result in the tool binding on the setting sleeve, whereby the use of the outer taper 348 will allow the tool to slide off easier from the setting sleeve. In an embodiment, the outer taper 348A may be formed at an angle φ of about 5 degrees with respect to the axis 358. The length of the taper 348A may be about 0.5 inches to about 0.75 inches There may be a neck or transition portion 349, such that the mandrel may have variation with its outer diameter. In an embodiment, the mandrel 314 may have a first outer diameter D1 that is greater than a second outer diameter D2. Conventional mandrel components are configured with shoulders (i.e., a surface angle of about 90 degrees) that result in components prone to direct shearing and failure. In contrast, embodiments of the disclosure may include the transition portion 349 configured with an angled transition surface 349A. A transition surface angle b may be about 25 degrees with respect to the tool (or tool component axis) 358.

The transition portion 349 may withstand radial forces upon compression of the tool components, thus sharing the load. That is, upon compression the bearing plate 383 and mandrel 314, the forces are not oriented in just a shear direction. The ability to share load(s) among components means the components do not have to be as large, resulting in an overall smaller tool size.

There may be one or more protrusions or dogs 395A disposed on a lateral end of the proximate end 348. The protrusion 395A may include an elevated portion 370A that transitions to a lower portion 370B. While not meant to be limited, FIG. 3A shows there may be about three protrusions 395A on the lateral end of the proximate end 348.

In addition to the first set of threads 316, the mandrel 314 may have a second set of threads 318. In one embodiment, the second set of threads 318 may be rounded threads disposed along an external mandrel surface 345 at the distal end 346. The use of rounded threads may increase the shear strength of the threaded connection.

FIG. 3D illustrates an embodiment of component connectivity at the distal end 346 of the mandrel 314. As shown, the mandrel 314 may be coupled with a sleeve 360 having corresponding threads 362 configured to mate with the second set of threads 318. In this manner, setting of the tool may result in distribution of load forces along the second set of threads 318 at an angle a away from axis 358. There may be one or more balls 364 disposed between the sleeve 360 and slip 334. The balls 364 may help promote even breakage of the slip 334.

Accordingly, the use of round threads may allow a non-axial interaction between surfaces, such that there may be vector forces in other than the shear/axial direction. The round thread profile may create radial load (instead of shear) across the thread root. As such, the rounded thread profile may also allow distribution of forces along more thread surface(s). As composite material is typically best suited for compression, this allows smaller components and added thread strength. This beneficially provides upwards of 5-times strength in the thread profile as compared to conventional composite tool connections.

With particular reference to FIG. 3C, the mandrel 314 may have a ball seat 386 disposed therein. In some embodiments, the ball seat 386 may be a separate component, while in other embodiments the ball seat 386 may be formed integral with the mandrel 314. There also may be a drop ball seat surface 359 formed within the bore 350 at the proximate end 348. The ball seat 359 may have a radius 359A that provides a rounded edge or surface for the drop ball to mate with. In an embodiment, the radius 359A of seat 359 may be smaller than the ball that seats in the seat. Upon seating, pressure may "urge" or otherwise wedge the drop ball into the radius, whereby the drop ball will not unseat without an extra amount of pressure. The amount of pressure required to urge and wedge the drop ball against the radius surface, as well as the amount of pressure required to unwedge the drop ball, may be predetermined. Thus, the size of the drop ball, ball seat, and radius may be designed, as applicable.

The use of a small curvature or radius 359A may be advantageous as compared to a conventional sharp point or edge of a ball seat surface. For example, radius 359A may provide the tool with the ability to accommodate drop balls with variation in diameter, as compared to a specific diameter. In addition, the surface 359 and radius 359A may be better suited to distribution of load around more surface area of the ball seat as compared to just at the contact edge/point of other ball seats.

Referring now to FIGS. 6A, 6B, 6C, 6D, 6E, and 6F together, an isometric view, a longitudinal cross-sectional view, a close-up longitudinal cross-sectional view, a side longitudinal view, a longitudinal cross-sectional view, and an underside isometric view, respectively, of a composite deformable member 320 (and its subcomponents) usable with a downhole tool in accordance with embodiments disclosed herein, are shown. The composite member 320 may be configured in such a manner that upon a compressive force, at least a portion of the composite member may begin to deform (or expand, deflect, twist, unspring, break, unwind, etc.) in a radial direction away from the tool axis (e.g., 258, FIG. 2C). Although exemplified as "composite", it is within the scope of the disclosure that member 320 may be made from metal, including alloys and so forth.

During the setting sequence, the seal element 322 and the composite member 320 may compress together. As a result of an angled exterior surface 389 of the seal element 322 coming into contact with the interior surface 388 of the composite member 320, a deformable (or first or upper) portion 326 of the composite member 320 may be urged radially outward and into engagement the surrounding tubular (not shown) at or near a location where the seal element 322 at least partially sealingly engages the surrounding tubular. There may also be a resilient (or second or lower) portion 328. In an embodiment, the resilient portion 328 may be configured with greater or increased resilience to deformation as compared to the deformable portion 326.

The composite member 320 may be a composite component having at least a first material 331 and a second material 332, but composite member 320 may also be made of a single material. The first material 331 and the second material 332 need not be chemically combined. In an embodiment, the first material 331 may be physically or chemically bonded, cured, molded, etc. with the second material 332. Moreover, the second material 332 may likewise be physically or chemically bonded with the deformable portion 326. In other embodiments, the first material 331 may be a composite material, and the second material 332 may be a second composite material.

The composite member 320 may have cuts or grooves 330 formed therein. The use of grooves 330 and/or spiral (or helical) cut pattern(s) may reduce structural capability of the deformable portion 326, such that the composite member 320 may "flower" out. The groove 330 or groove pattern is not meant to be limited to any particular orientation, such that any groove 330 may have variable pitch and vary radially.

With groove(s) 330 formed in the deformable portion 326, the second material 332, may be molded or bonded to the deformable portion 326, such that the grooves 330 are filled in and enclosed with the second material 332. In embodiments, the second material 332 may be an elastomeric material. In other embodiments, the second material 332 may be 60-95 Duro A polyurethane or silicone. Other materials may include, for example, TFE or PTFE sleeve option-heat shrink. The second material 332 of the composite member 320 may have an inner material surface 368.

Different downhole conditions may dictate choice of the first and/or second material. For example, in low temp operations (e.g., less than about 250 F), the second material comprising polyurethane may be sufficient, whereas for high temp operations (e.g., greater than about 250 F) polyurethane may not be sufficient and a different material like silicone may be used.

The use of the second material 332 in conjunction with the grooves 330 may provide support for the groove pattern and reduce preset issues. With the added benefit of second material 332 being bonded or molded with the deformable portion 326, the compression of the composite member 320 against the seal element 322 may result in a robust, reinforced, and resilient barrier and seal between the components and with the inner surface of the tubular member (e.g., 208 in FIG. 2B). As a result of increased strength, the seal, and hence the tool of the disclosure, may withstand higher downhole pressures. Higher downhole pressures may provide a user with better frac results.

Groove(s) 330 allow the composite member 320 to expand against the tubular, which may result in a formidable barrier between the tool and the tubular. In an embodiment, the groove 330 may be a spiral (or helical, wound, etc.) cut formed in the deformable portion 326. In an embodiment, there may be a plurality of grooves or cuts 330. In another embodiment, there may be two symmetrically formed grooves 330, as shown by way of example in FIG. 6E. In yet another embodiment, there may be three grooves 330.

Figure 6A:
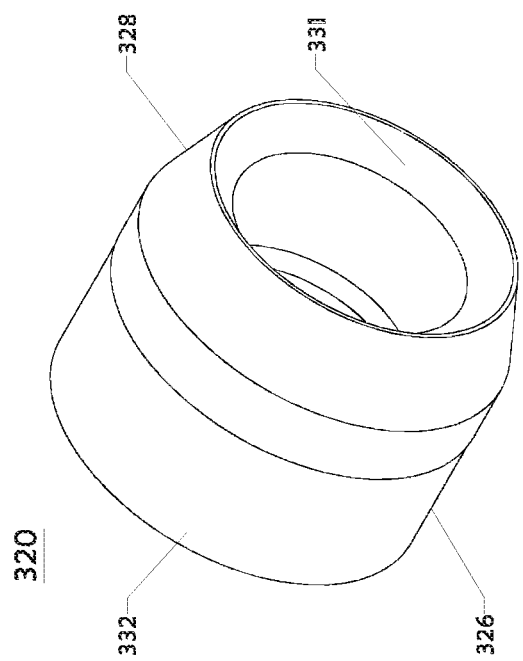
FIG. 6A shows an isometric view of a composite deformable member usable with a downhole tool according to embodiments of the disclosure.
Figure 6B:
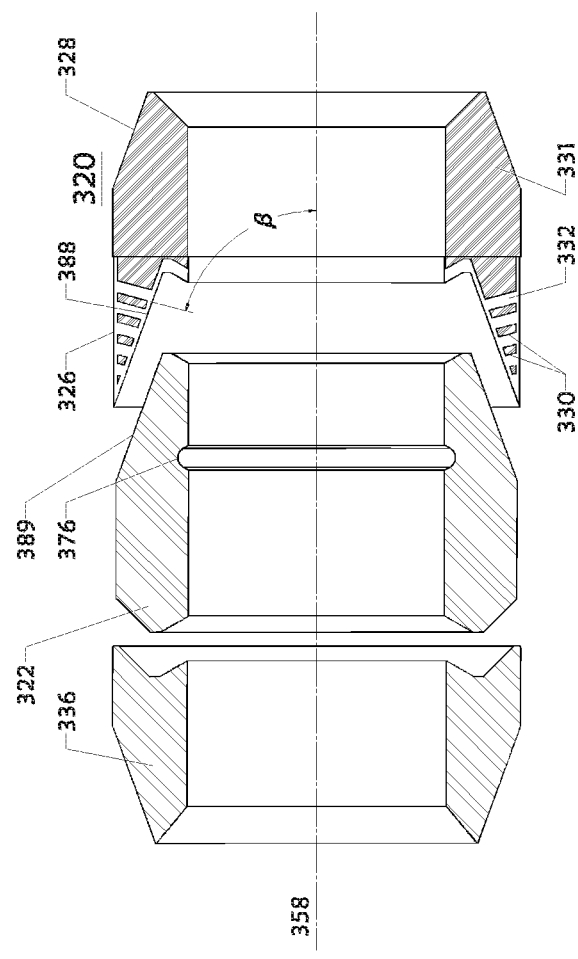
FIG. 6B shows a longitudinal cross-sectional view of a composite deformable member usable with a downhole tool according to embodiments of the disclosure.
Figure 6C:
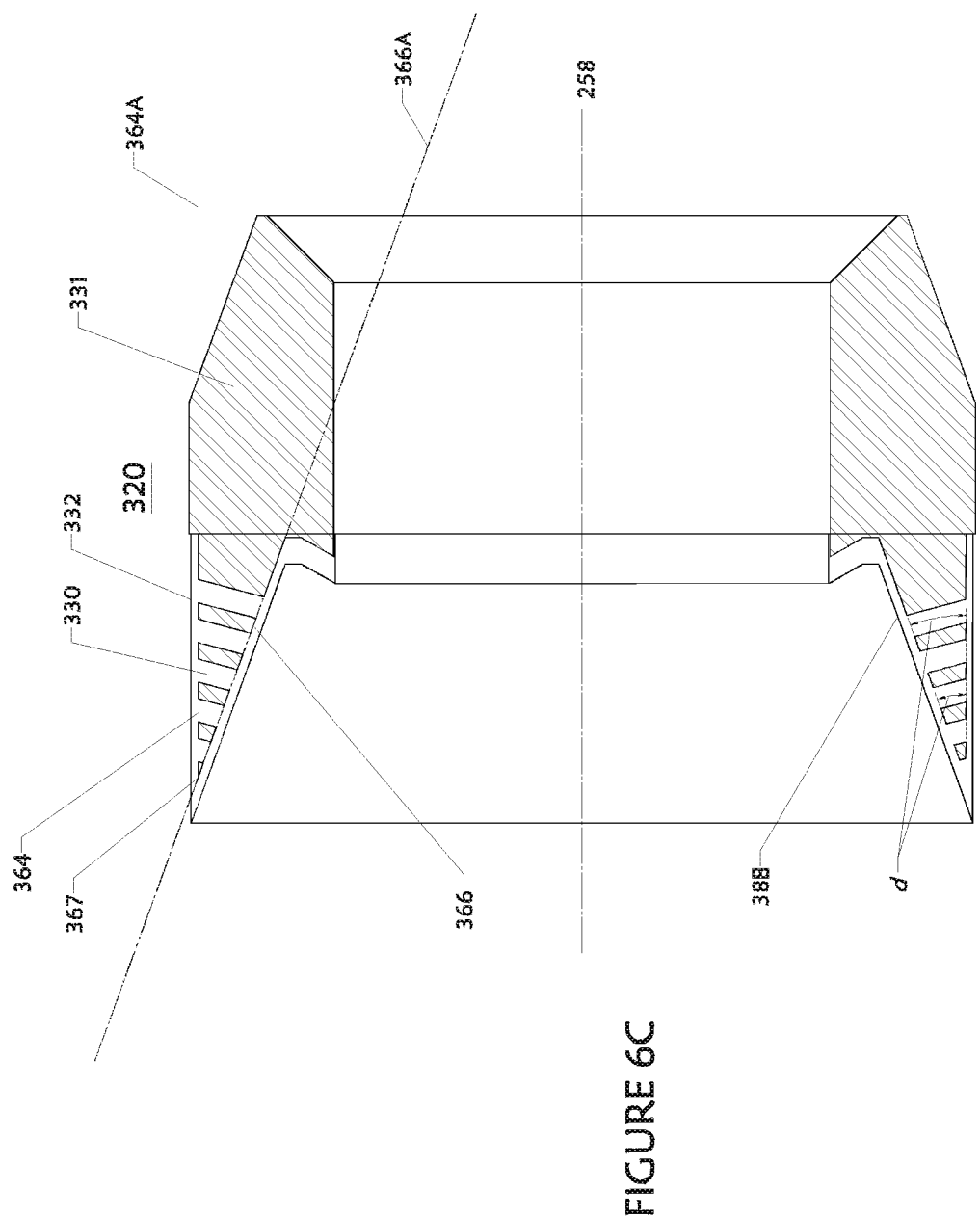
FIG. 6C shows a close-up longitudinal cross-sectional view of a composite deformable member usable with a downhole tool according to embodiments of the disclosure.
Figure 6F:
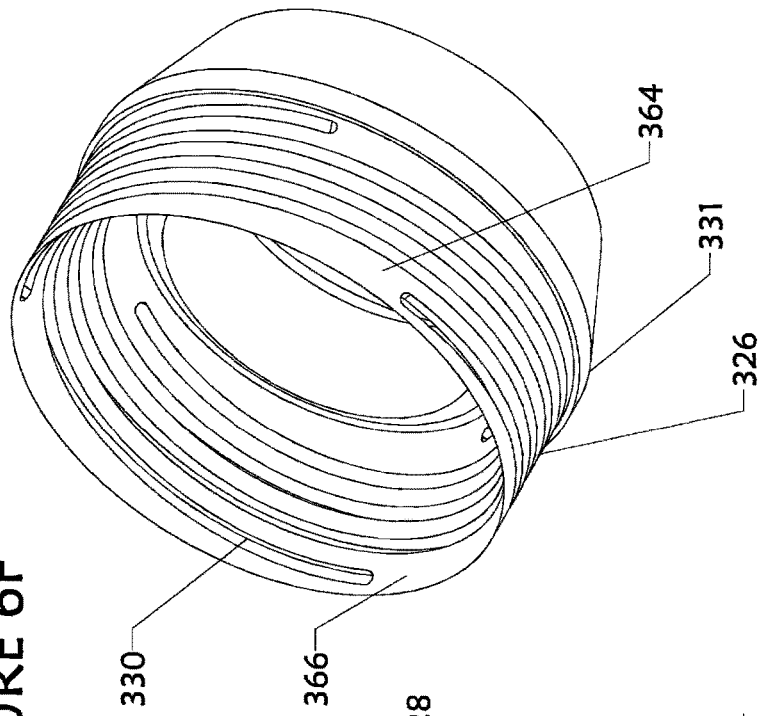
FIG. 6F shows an underside isometric view of a composite deformable member usable with a downhole tool according to embodiments of the disclosure.
Figure 6E:
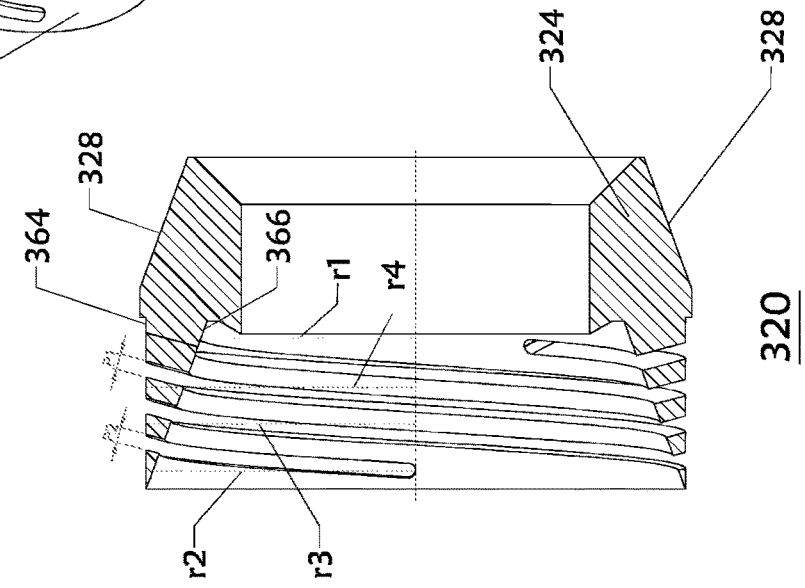
FIG. 6E shows a longitudinal cross-sectional view of a composite deformable member usable with a downhole tool according to embodiments of the disclosure.
Figure 6D:
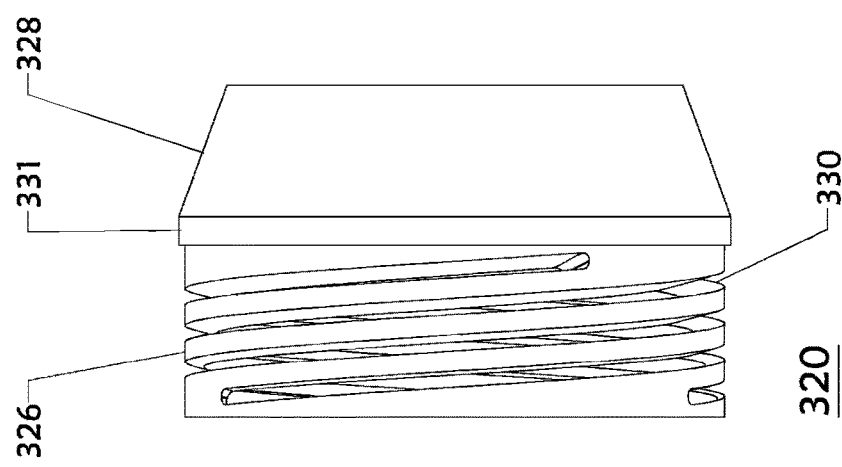
FIG. 6D shows a side longitudinal view of a composite deformable member usable with a downhole tool according to embodiments of the disclosure.

As illustrated by FIG. 6C, the depth d of any cut or groove 330 may extend entirely from an exterior side surface 364 to an upper side interior surface 366. The depth d of any groove 330 may vary as the groove 330 progresses along the deformable portion 326. In an embodiment, an outer planar surface 364A may have an intersection at points tangent the exterior side 364 surface, and similarly, an inner planar surface 366A may have an intersection at points tangent the upper side interior surface 366. The planes 364A and 366A of the surfaces 364 and 366, respectively, may be parallel or they may have an intersection point 367. Although the composite member 320 is depicted as having a linear surface illustrated by plane 366A, the composite member 320 is not meant to be limited, as the inner surface may be non-linear or non-planar (i.e., have a curvature or rounded profile).

In an embodiment, the groove(s) 330 or groove pattern may be a spiral pattern having constant pitch ($p_1$ about the same as $p_2$), constant radius ($r_3$ about the same as $r_4$) on the outer surface 364 of the deformable member 326. In an embodiment, the spiral pattern may include constant pitch ($p_1$ about the same as $p_2$), variable radius ($r_1$ unequal to $r_2$) on the inner surface 366 of the deformable member 326.

In an embodiment, the groove(s) 330 or groove pattern may be a spiral pattern having variable pitch ($p_1$ unequal to $p_2$), constant radius ($r_3$ about the same as $r_4$) on the outer surface 364 of the deformable member 326. In an embodiment, the spiral pattern may include variable pitch ($p_1$ unequal to $p_2$), variable radius ($r_1$ unequal to $r_2$) on the inner surface 366 of the deformable member 320.

As an example, the pitch (e.g., $p_1$, $p_2$, etc.) may be in the range of about 0.5 turns/inch to about 1.5 turns/inch. As another example, the radius at any given point on the outer surface may be in the range of about 1.5 inches to about 8 inches. The radius at any given point on the inner surface may be in the range of about less than 1 inch to about 7 inches. Although given as examples, the dimensions are not meant to be limiting, as other pitch and radial sizes are within the scope of the disclosure.

In an exemplary embodiment reflected in FIG. 6B, the composite member 320 may have a groove pattern cut on a back angle β. A pattern cut or formed with a back angle may allow the composite member 320 to be unrestricted while expanding outward. In an embodiment, the back angle β may be about 75 degrees (with respect to axis 258). In other embodiments, the angle β may be in the range of about 60 to about 120 degrees The presence of groove(s) 330 may allow the composite member 320 to have an unwinding, expansion, or "flower" motion upon compression, such as by way of compression of a surface (e.g., surface 389) against the interior surface of the deformable portion 326. For example, when the seal element 322 moves, surface 389 is forced against the interior surface 388. Generally the failure mode in a high pressure seal is the gap between components; however, the ability to unwind and/or expand allows the composite member 320 to extend completely into engagement with the inner surface of the surrounding tubular.

Figure 4A:
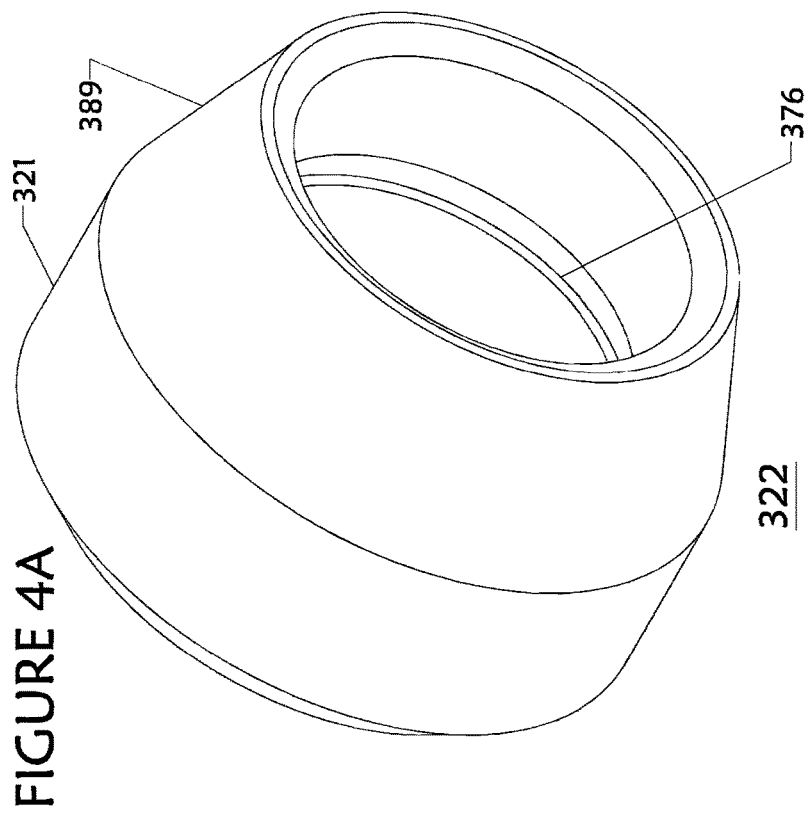
FIG. 4A shows a longitudinal cross-sectional view of a seal element usable with a downhole tool according to embodiments of the disclosure.
Figure 4B:
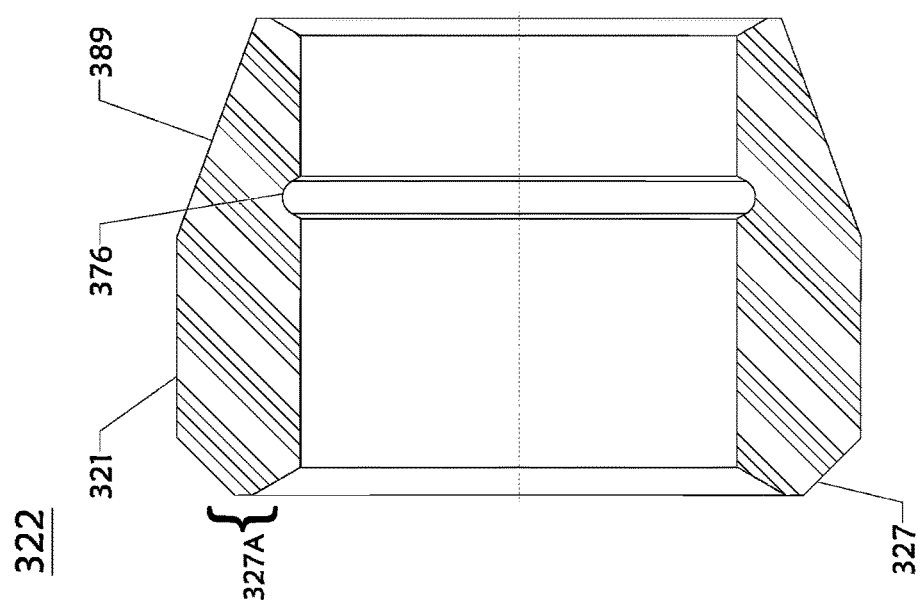
FIG. 4B shows an isometric view of a seal element usable with a downhole tool according to embodiments of the disclosure.

Referring now to FIGS. 4A and 4B together, a longitudinal cross-sectional view and an isometric view of a seal element (and its subcomponents), respectively, usable with a downhole tool in accordance with embodiments disclosed herein are shown. The seal element 322 may be made of an elastomeric and/or poly material, such as rubber, nitrile rubber, Viton or polyeurethane, and may be configured for positioning or otherwise disposed around the mandrel (e.g.,

214, FIG. 32C). In an embodiment, the seal element 322 may be made from 75 Duro A elastomer material. The seal element 322 may be disposed between a first slip and a second slip (see FIG. 2C, seal element 222 and slips 234, 236).

The seal element 322 may be configured to buckle (deform, compress, etc.), such as in an axial manner, during the setting sequence of the downhole tool (202, FIG. 2C). However, although the seal element 322 may buckle, the seal element 322 may also be adapted to expand or swell, such as in a radial manner, into sealing engagement with the surrounding tubular (208, FIG. 2B) upon compression of the tool components. In a preferred embodiment, the seal element 322 provides a fluid-tight seal of the seal surface 321 against the tubular.

The seal element 322 may have one or more angled surfaces configured for contact with other component surfaces proximate thereto. For example, the seal element may have angled surfaces 327 and 389. The seal element 322 may be configured with an inner circumferential groove 376. The presence of the groove 376 assists the seal element 322 to initially buckle upon start of the setting sequence. The groove 376 may have a size (e.g., width, depth, etc.) of about 0.25 inches.

Slips. Referring now to FIGS. 5A, 5B, 5C, 5D, 5E, 5F, and 5G together, an isometric view, a lateral view, and a longitudinal cross-sectional view of one or more slips, and an isometric view of a metal slip, a lateral view of a metal slip, a longitudinal cross-sectional view of a metal slip, and an isometric view of a metal slip without buoyant material holes, respectively, (and related subcomponents) usable with a downhole tool in accordance with embodiments disclosed herein are shown. The slips 334, 342 described may be made from metal, such as cast iron, or from composite material, such as filament wound composite. During operation, the winding of the composite material may work in conjunction with inserts under compression in order to increase the radial load of the tool.

Either or both of slips 334, 342 may be made of non-composite material, such as a metal or metal alloys. Either or both of slips 334, 342 may be made of a reactive material (e.g., dissolvable, degradable, etc.). In embodiments, the material may be a metallic material, such as an aluminum-based or magnesium-based material. The metallic material may be reactive, such as dissolvable, which is to say under certain conditions the respective component(s) may begin to dissolve, and thus alleviating the need for drill thru. In embodiments, any slip of the tool 202 may be made of dissolvable aluminum-, magnesium-, or aluminum-magnesium-based (or alloy, complex, etc.) material, such as that provided by Nanjing Highsur Composite Materials Technology Co. LTD.

Figure 5A:
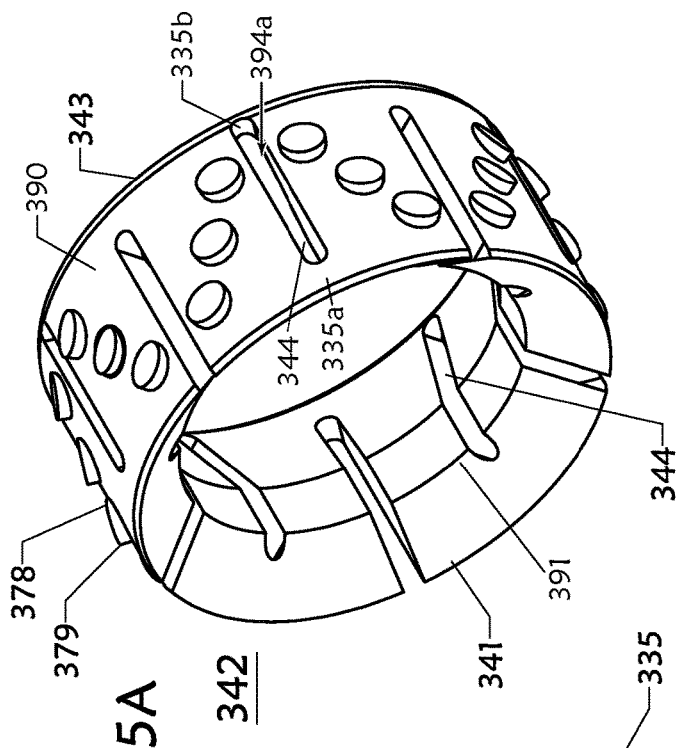
FIG. 5A shows an isometric view of one or more slips usable with a downhole tool according to embodiments of the disclosure.
Figure 5C:
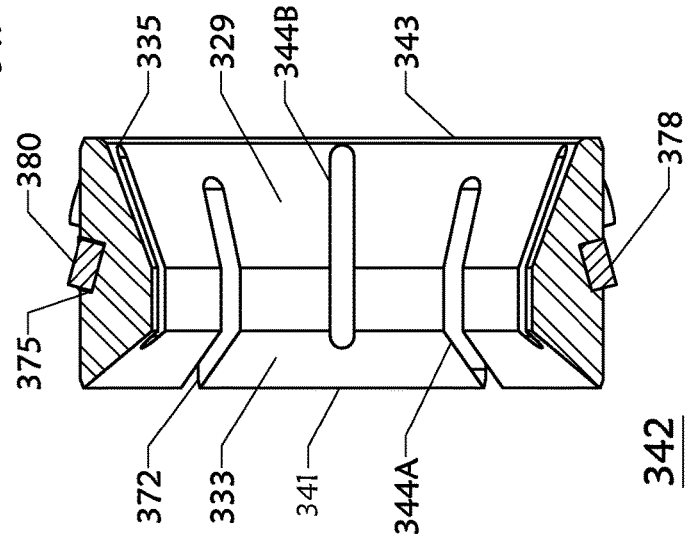
FIG. 5C shows a longitudinal cross-sectional view of one or more slips usable with a downhole tool according to embodiments of the disclosure.
Figure 5B:
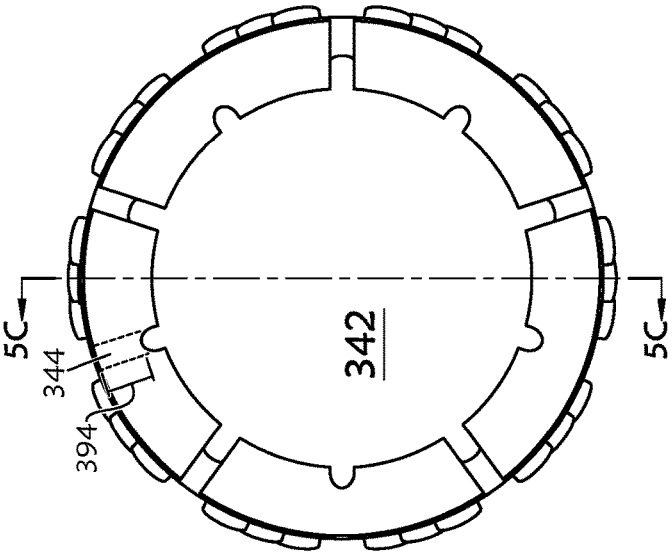
FIG. 5B shows a lateral view of one or more slips usable with a downhole tool according to embodiments of the disclosure.
Figure 5D:
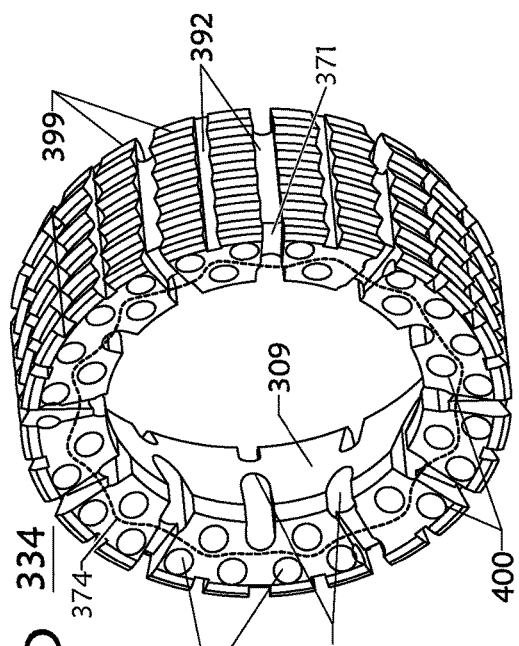
FIG. 5D shows an isometric view of a metal slip usable with a downhole tool according to embodiments of the disclosure.

Slips 334, 342 may be used in either upper or lower slip position, or both, without limitation. As apparent, there may be a first slip 334, which may be disposed around the mandrel (214, FIG. 2C), and there may also be a second slip 342, which may also be disposed around the mandrel. Either of slips 334, 342 may include a means for gripping the inner wall of the tubular, casing, and/or well bore, such as a plurality of gripping elements, including serrations or teeth 398, inserts 378, etc. As shown in FIGS. 5D-5F, the first slip 334 may include rows and/or columns 399 of serrations 398. The gripping elements may be arranged or configured whereby the slips 334, 342 engage the tubular (not shown) in such a manner that movement (e.g., longitudinally axially) of the slips or the tool once set is prevented.

In embodiments, the slip 334 may be a poly-moldable material. In other embodiments, the slip 334 may be hardened, surface hardened, heat-treated, carburized, etc., as would be apparent to one of ordinary skill in the art. However, in some instances, slips 334 may be too hard and end up as too difficult or take too long to drill through.

Typically, hardness on the teeth 398 may be about 40-60 Rockwell. As understood by one of ordinary skill in the art, the Rockwell scale is a hardness scale based on the indentation hardness of a material. Typical values of very hard steel have a Rockwell number (HRC) of about 55-66. In some aspects, even with only outer surface heat treatment the inner slip core material may become too hard, which may result in the slip 334 being impossible or impracticable to drill-thru.

Thus, the slip 334 may be configured to include one or more holes 393 formed therein. The holes 393 may be longitudinal in orientation through the slip 334. The presence of one or more holes 393 may result in the outer surface(s) 307 of the metal slips as the main and/or majority slip material exposed to heat treatment, whereas the core or inner body (or surface) 309 of the slip 334 is protected. In other words, the holes 393 may provide a barrier to transfer of heat by reducing the thermal conductivity (i.e., k-value) of the slip 334 from the outer surface(s) 307 to the inner core or surfaces 309. The presence of the holes 393 is believed to affect the thermal conductivity profile of the slip 334, such that that heat transfer is reduced from outer to inner because otherwise when heat/quench occurs the entire slip 334 heats up and hardens.

Thus, during heat treatment, the teeth 398 on the slip 334 may heat up and harden resulting in heat-treated outer area/teeth, but not the rest of the slip. In this manner, with treatments such as flame (surface) hardening, the contact point of the flame is minimized (limited) to the proximate vicinity of the teeth 398.

With the presence of one or more holes 393, the hardness profile from the teeth to the inner diameter/core (e.g., laterally) may decrease dramatically, such that the inner slip material or surface 309 has a HRC of about ~15 (or about normal hardness for regular steel/cast iron). In this aspect, the teeth 398 stay hard and provide maximum bite, but the rest of the slip 334 is easily drillable.

One or more of the void spaces/holes 393 may be filled with useful "buoyant" (or low density) material 400 to help debris and the like be lifted to the surface after drill-thru. The material 400 disposed in the holes 393 may be, for example, polyurethane, light weight beads, or glass bubbles/beads such as the K-series glass bubbles made by and available from 3M. Other low-density materials may be used.

The advantageous use of material 400 helps promote lift on debris after the slip 334 is drilled through. The material 400 may be epoxied or injected into the holes 393 as would be apparent to one of skill in the art.

The metal slip 334 may be treated with an induction hardening process. In such a process, the slip 334 may be moved through a coil that has a current run through it. As a result of physical properties of the metal and magnetic properties, a current density (created by induction from the e-field in the coil) may be controlled in a specific location of the teeth 398. This may lend to speed, accuracy, and repeatability in modification of the hardness profile of the slip 334. Thus, for example, the teeth 398 may have a RC in excess of 60, and the rest of the slip 334 (essentially virgin, unchanged metal) may have a RC less than about 15.

The slots 392 in the slip 334 may promote breakage. An evenly spaced configuration of slots 392 promotes even breakage of the slip 334. The metal slip 334 may have a body having a one-piece configuration defined by at least partial connectivity of slip material around the entirety of the body, as shown in FIG. 5D via connectivity reference line 374. The slip 334 may have at least one lateral groove 371. The lateral groove may be defined by a depth 373. The depth 373 may extend from the outer surface 307 to the inner surface 309.

First slip 334 may be disposed around or coupled to the mandrel (214, FIG. 2B) as would be known to one of skill in the art, such as a band or with shear screws (not shown) configured to maintain the position of the slip 334 until sufficient pressure (e.g., shear) is applied. The band may be made of steel wire, plastic material or composite material having the requisite characteristics in sufficient strength to hold the slip 334 in place while running the downhole tool into the wellbore, and prior to initiating setting. The band may be drillable.

When sufficient load is applied, the slip 334 compresses against the resilient portion or surface of the composite member (e.g., 220, FIG. 2C), and subsequently expand radially outwardly to engage the surrounding tubular (see, for example, slip 234 and composite member 220 in FIG. 2C).

Figure 5G:
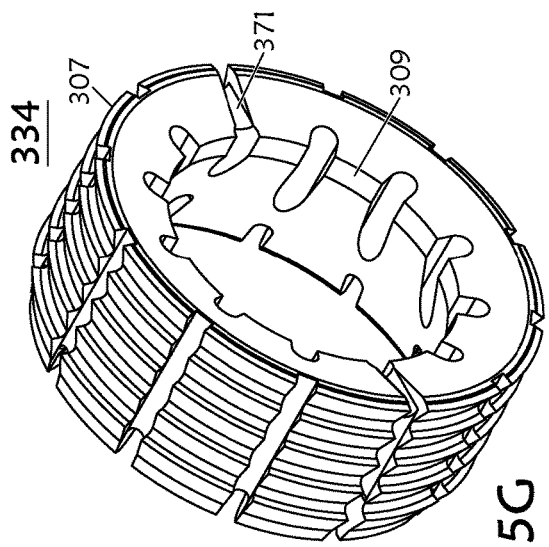
FIG. 5G shows an isometric view of a metal slip without buoyant material holes usable with a downhole tool according to embodiments of the disclosure.
Figure 5F:
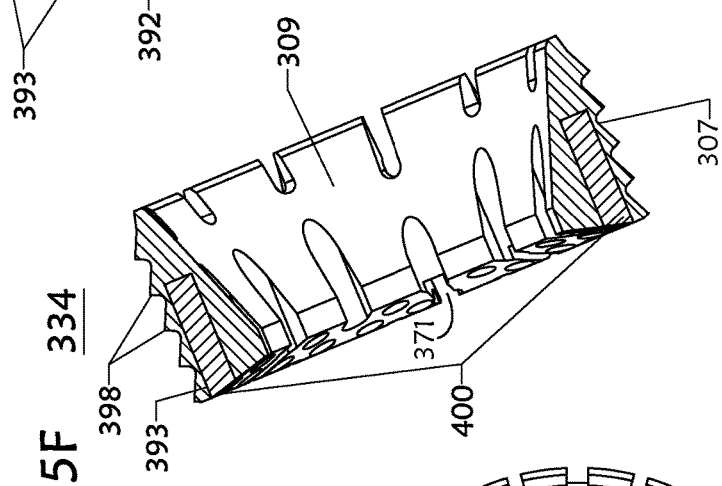
FIG. 5F shows a longitudinal cross-sectional view of a metal slip usable with a downhole tool according to embodiments of the disclosure.
Figure 5E:
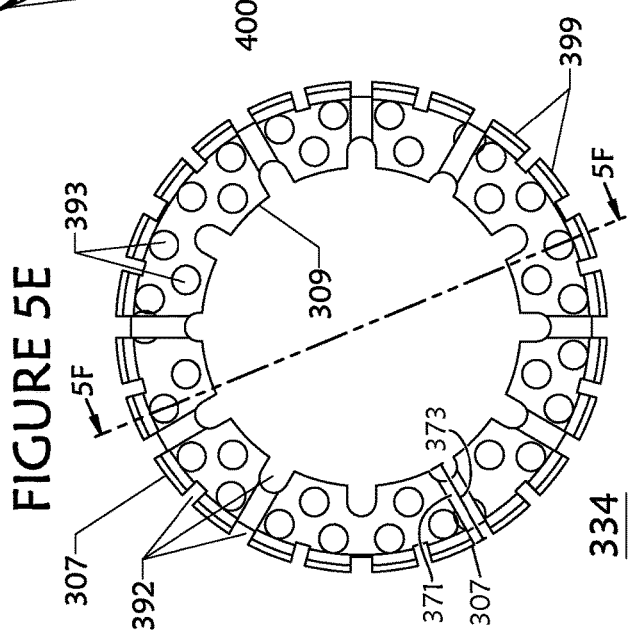
FIG. 5E shows a lateral view of a metal slip usable with a downhole tool according to embodiments of the disclosure.

FIG. 5G illustrates slip 334 may be a hardened cast iron slip without the presence of any grooves or holes 393 formed therein.

Referring again to FIGS. 5A-5C, slip 342 may be a one-piece slip, whereby the slip 342 has at least partial connectivity across its entire circumference. Meaning, while the slip 342 itself may have one or more grooves 344 configured therein, the slip 342 has no separation point in the pre-set configuration. In an embodiment, the grooves 344 may be equidistantly spaced or cut in the second slip 342. In other embodiments, the grooves 344 may have an alternatingly arranged configuration. That is, one groove 344A may be proximate to slip end 341 and adjacent groove 344B may be proximate to an opposite slip end 343. As shown in groove 344A may extend all the way through the slip end 341, such that slip end 341 is devoid of material at point 372. The slip 342 may have an outer slip surface 390 and an inner slip surface 391.

Where the slip 342 is devoid of material at its ends, that portion or proximate area of the slip may have the tendency to flare first during the setting process. The arrangement or position of the grooves 344 of the slip 342 may be designed as desired. In an embodiment, the slip 342 may be designed with grooves 344 resulting in equal distribution of radial load along the slip 342. Alternatively, one or more grooves, such as groove 344B may extend proximate or substantially close to the slip end 343, but leaving a small amount material 335 therein. The presence of the small amount of material gives slight rigidity to hold off the tendency to flare. As such, part of the slip 342 may expand or flare first before other parts of the slip 342. There may be one or more grooves 344 that form a lateral opening 394a through the entirety of the slip body. That is, groove 344 may extend a depth 394 from the outer slip surface 390 to the inner slip surface 391. Depth 394 may define a lateral distance or length of how far material is removed from the slip body with reference to slip surface 390 (or also slip surface 391). FIG. 5A illustrates the at least one of the grooves 344 may be further defined by the presence of a first portion of slip material 335a on or at first end 341, and a second portion of slip material 335b on or at second end 343.

The slip 342 may have one or more inner surfaces with varying angles. For example, there may be a first angled slip surface 329 and a second angled slip surface 333. In an embodiment, the first angled slip surface 329 may have a 20-degree angle, and the second angled slip surface 333 may have a 40-degree angle; however, the degree of any angle of the slip surfaces is not limited to any particular angle. Use of angled surfaces allows the slip 342 significant engagement force, while utilizing the smallest slip 342 possible.

The use of a rigid single- or one-piece slip configuration may reduce the chance of presetting that is associated with conventional slip rings, as conventional slips are known for pivoting and/or expanding during run in. As the chance for pre-set is reduced, faster run-in times are possible.

The slip 342 may be used to lock the tool in place during the setting process by holding potential energy of compressed components in place. The slip 342 may also prevent the tool from moving as a result of fluid pressure against the tool. The second slip (342, FIG. 5A) may include inserts 378 disposed thereon. In an embodiment, the inserts 378 may be epoxied or press fit into corresponding insert bores or grooves 375 formed in the slip 342.

Referring briefly to FIGS. 10A-10D together, an underside isometric view of an insert(s) configured with a hole, an underside isometric views of another insert(s), and a topside isometric view of an insert(s), respectively, usable with the slip(s) of the present disclosure are shown. One or more of the inserts 378 may have a flat surface 380A or concave surface 380. In an embodiment, the concave surface 380 may include a depression 377 formed therein. One or more of the inserts 378 may have a sharpened (e.g., machined) edge or corner 379, which allows the insert 378 greater biting ability.

Figure 8A:
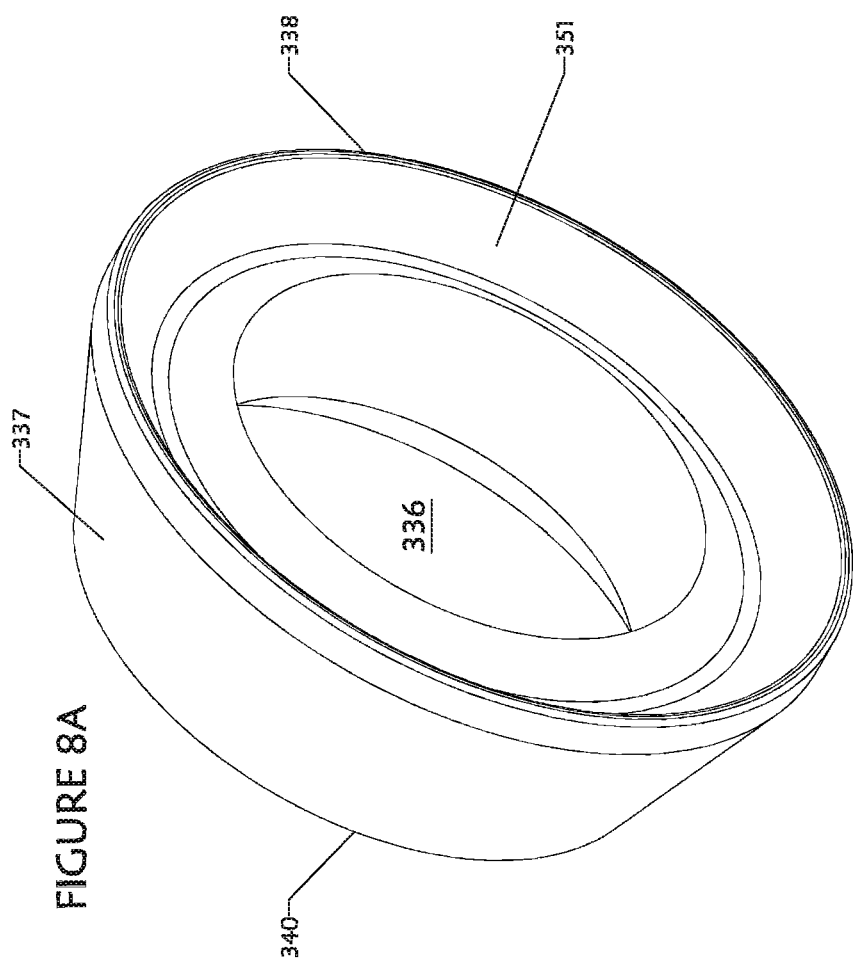
FIG. 8A shows an underside isometric view of a cone usable with a downhole tool according to embodiments of the disclosure.
Figure 8B:
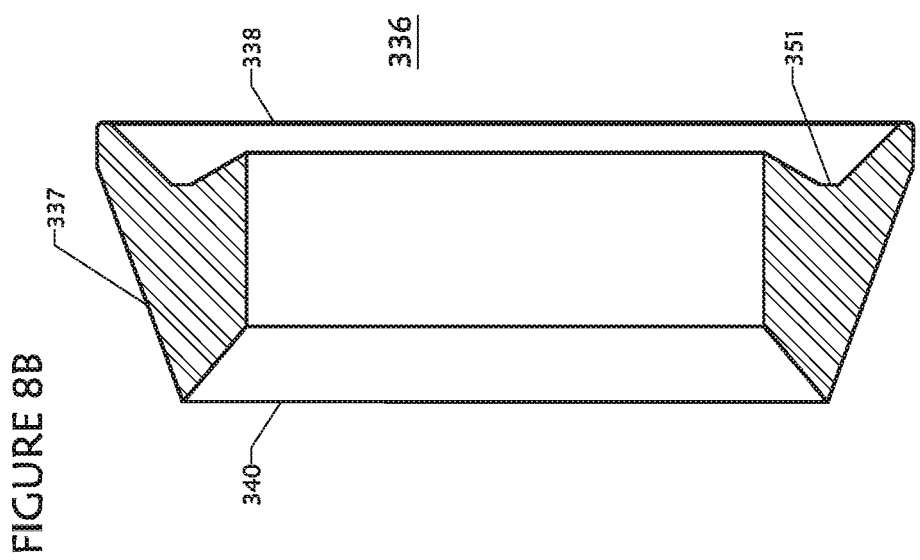
FIG. 8B shows a longitudinal cross-sectional view of a cone usable with a downhole tool according to embodiments of the disclosure.

Referring now to FIGS. 8A and 8B together, an underside isometric view and a longitudinal cross-sectional view, respectively, of one or more cones 336 (and its subcomponents) usable with a downhole tool in accordance with embodiments disclosed herein, are shown. In an embodiment, cone 336 may be slidingly engaged and disposed around the mandrel (e.g., cone 236 and mandrel 214 in FIG. 2C). Cone 336 may be disposed around the mandrel in a manner with at least one surface 337 angled (or sloped, tapered, etc.) inwardly with respect to other proximate components, such as the second slip (242, FIG. 2C). As such, the cone 336 with surface 337 may be configured to cooperate with the slip to force the slip radially outwardly into contact or gripping engagement with a tubular, as would be apparent and understood by one of skill in the art.

During setting, and as tension increases through the tool, an end of the cone 336, such as second end 340, may compress against the slip (see FIG. 2C). As a result of conical surface 337, the cone 336 may move to the underside beneath the slip, forcing the slip outward and into engagement with the surrounding tubular (see FIG. 2A). A first end 338 of the cone 336 may be configured with a cone profile 351. The cone profile 351 may be configured to mate with the seal element (222, FIG. 2C). In an embodiment, the cone profile 351 may be configured to mate with a corresponding profile 327A of the seal element (see FIG. 4A). The cone profile 351 may help restrict the seal element from rolling over or under the cone 336.

Figure 9A:
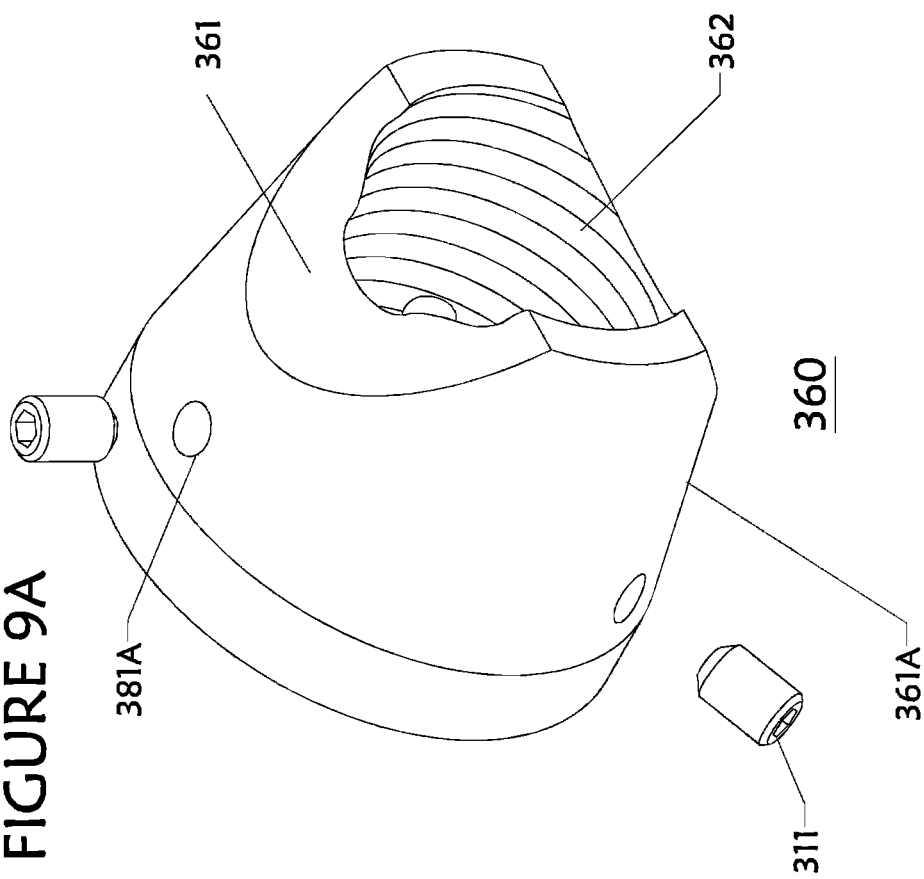
FIG. 9A shows an isometric view of a lower sleeve usable with a downhole tool according to embodiments of the disclosure.
Figure 9B:
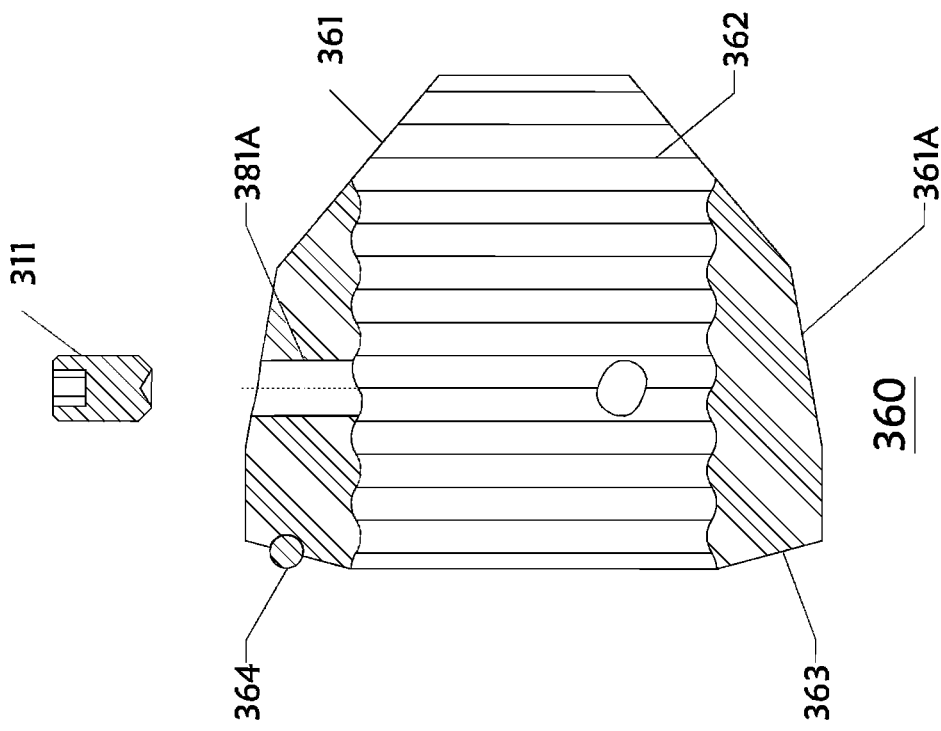
FIG. 9B shows a longitudinal cross-sectional view of a lower sleeve usable with a downhole tool according to embodiments of the disclosure.
Figure 10D:
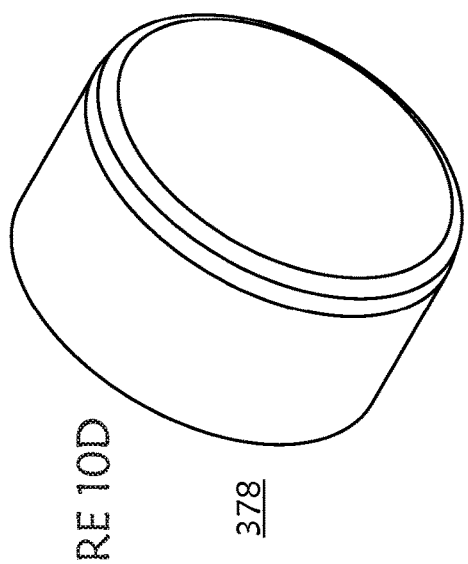
FIG. 10D shows a topside isometric view of an insert(s) usable with a slip(s) according to embodiments of the disclosure.
Figure 10C:
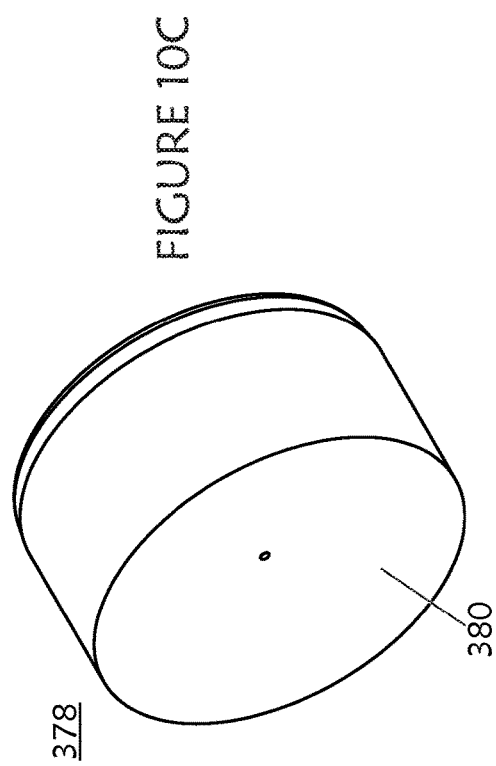
FIG. 10C shows an underside isometric views of an insert(s) usable with a slip(s) according to embodiments of the disclosure.
Figure 10B:
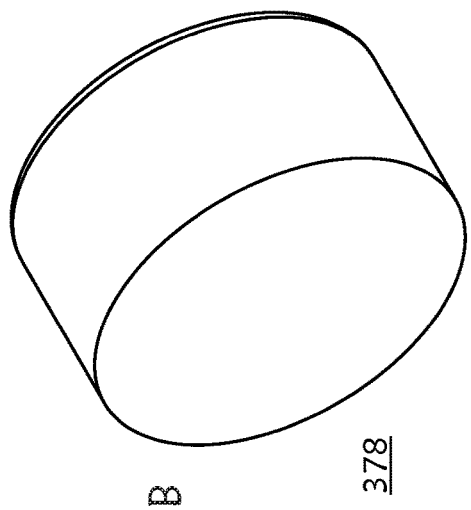
FIG. 10B shows an underside isometric views of an insert(s) usable with a slip(s) according to embodiments of the disclosure.
Figure 10A:
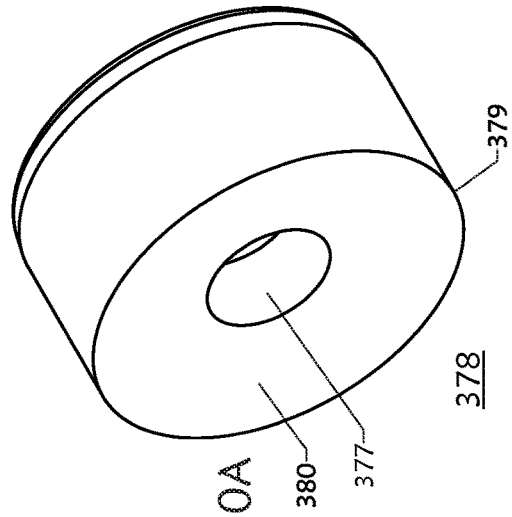
FIG. 10A shows an underside isometric view of an insert(s) configured with a hole usable with a slip(s) according to embodiments of the disclosure.

Referring now to FIGS. 9A and 9B, an isometric view, and a longitudinal cross-sectional view, respectively, of a lower sleeve 360 (and its subcomponents) usable with a downhole tool in accordance with embodiments disclosed herein, are shown. During setting, the lower sleeve 360 will be pulled as a result of its attachment to the mandrel 214. As shown in FIGS. 9A and 9B together, the lower sleeve 360 may have one or more holes 381A that align with mandrel holes (281B, FIG. 2C). One or more anchor pins 311 may be disposed or securely positioned therein. In an embodiment, brass set screws may be used. Pins (or screws, etc.) 311 may prevent shearing or spin off during drilling.

As the lower sleeve 360 is pulled, the components disposed about mandrel between the may further compress against one another. The lower sleeve 360 may have one or more tapered surfaces 361, 361A which may reduce chances of hang up on other tools. The lower sleeve 360 may also have an angled sleeve end 363 in engagement with, for example, the first slip (234, FIG. 2C). As the lower sleeve 360 is pulled further, the end 363 presses against the slip. The lower sleeve 360 may be configured with an inner thread profile 362. In an embodiment, the profile 362 may include rounded threads. In another embodiment, the profile 362 may be configured for engagement and/or mating with the mandrel (214, FIG. 2C). Ball(s) 364 may be used. The ball(s) 364 may be for orientation or spacing with, for example, the slip 334. The ball(s) 364 and may also help maintain break symmetry of the slip 334. The ball(s) 364 may be, for example, brass or ceramic.

Figure 7A:
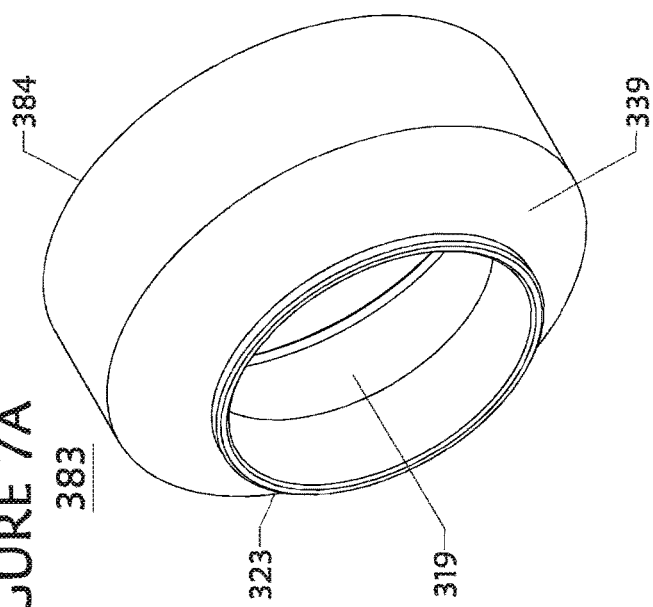
FIG. 7A shows an isometric view of a bearing plate usable with a downhole tool according to embodiments of the disclosure.
Figure 7B:
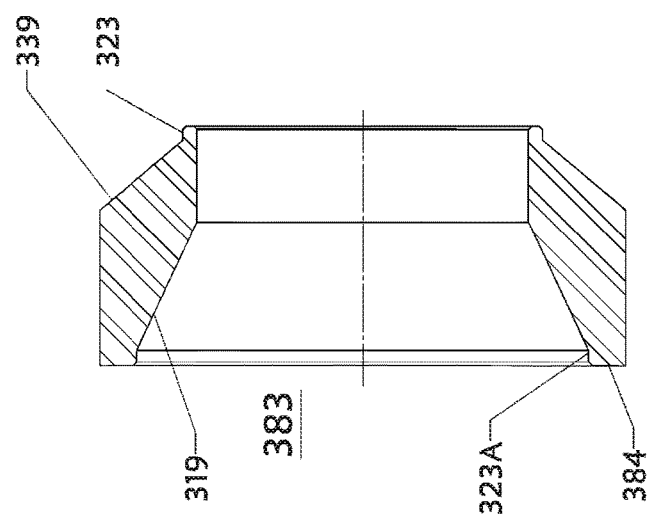
FIG. 7B shows a longitudinal cross-sectional view of a bearing plate usable with a downhole tool according to embodiments of the disclosure.

Referring now to FIGS. 7A and 7B together, an isometric view and a longitudinal cross-sectional view, respectively, of a bearing plate 383 (and its subcomponents) usable with a downhole tool in accordance with embodiments disclosed herein are shown. The bearing plate 383 may be made from filament wound material having wide angles. As such, the bearing plate 383 may endure increased axial load, while also having increased compression strength.

Because the sleeve (254, FIG. 2C) may held rigidly in place, the bearing plate 383 may likewise be maintained in place. The setting sleeve may have a sleeve end 255 that abuts against bearing plate end 284, 384. Briefly, FIG. 2C illustrates how compression of the sleeve end 255 with the plate end 284 may occur at the beginning of the setting sequence. As tension increases through the tool, an other end 239 of the bearing plate 283 may be compressed by slip 242, forcing the slip 242 outward and into engagement with the surrounding tubular (208, FIG. 2B).

Inner plate surface 319 may be configured for angled engagement with the mandrel. In an embodiment, plate surface 319 may engage the transition portion 349 of the mandrel 314. Lip 323 may be used to keep the bearing plate 383 concentric with the tool 202 and the slip 242. Small lip 323A may also assist with centralization and alignment of the bearing plate 383.

Referring now to FIGS. 11A and 11B together, a longitudinal side view a longitudinal side view of a downhole tool with a composite one-piece bottom position slip and a longitudinal cross-sectional side view of the downhole tool of FIG. 11A, in accordance with embodiments disclosed herein, are shown.

Downhole tool 1102 may be run, set, and operated as described herein and in other embodiments (such as in System 200, and so forth), and as otherwise understood to one of skill in the art. Components of the downhole tool 1102 may be arranged and disposed about a mandrel 1114, as described herein and in other embodiments, and as otherwise understood to one of skill in the art. Thus, downhole tool 1102 may be comparable or identical in aspects, function, operation, components, etc. as that of other tool embodiments disclosed herein. Similarities may not be discussed for the sake of brevity.

Operation of the downhole tool 1102 may allow for fast run in of the tool 1102 to isolate one or more sections of a wellbore as provided for herein. Drill-through of the tool 1102 may be facilitated by components and sub-components of tool 1102 made of drillable material that is less damaging to a drill bit than those found in conventional plugs and/or reactive materials that may make drilling easier, or even outright alleviate any need.

The downhole tool 1102 may have one or more components, such as slips 1134 and 1142, may be made of a material as described herein and in accordance with embodiments of the disclosure. Such materials may include composite material, reactive material (metals or composites), and so forth. Thus, the downhole tool 1102 may have one or more components made of non-composite material, such as a metal or metal alloys. The downhole tool 1102 may have one or more components made of a reactive material (e.g., dissolvable, degradable, etc.).

In embodiments, one or more components may be made of a metallic material, such as an aluminum-based or magnesium-based material. The metallic material may be reactive, such as dissolvable, which is to say under certain conditions the respective component(s) may begin to dissolve, and thus alleviating the need for drill thru. In embodiments, the components of the tool 1102 may be made of dissolvable aluminum-, magnesium-, or aluminum-magnesium-based (or alloy, complex, etc.) material, such as that provided by Nanjing Highsur Composite Materials Technology Co. LTD.

One or more components of tool 1102 may be made of non-dissolvable materials (e.g., materials suitable for and are known to withstand downhole environments [including extreme pressure, temperature, fluid properties, etc.] for an extended period of time (predetermined or otherwise) as may be desired).

Just the same, one or more components of a tool of embodiments disclosed herein may be made of reactive materials (e.g., materials suitable for and are known to dissolve, degrade, etc. in downhole environments [including extreme pressure, temperature, fluid properties, etc.] after a brief or limited period of time (predetermined or otherwise) as may be desired). In an embodiment, a component made of a reactive material may begin to react within about 3 to about 48 hours after setting of the downhole tool 1102.

The downhole tool 1102 (and other tool embodiments disclosed herein) and/or one or more of its components may be 3D printed as would be apparent to one of skill in the art.

The mandrel 1114 may extend through the tool (or tool body) 1102. The mandrel 114 may be a solid body. In other aspects, the mandrel 1114 may include a flowpath or bore 1150 formed therein (e.g., an axial bore). The bore 1150 may extend partially or for a short distance through the mandrel 1114. Alternatively, the bore 1150 may extend through the entire mandrel 1114, with an opening at its proximate end 1148 and oppositely at its distal end 1146.

With the presence of the bore 1150, the mandrel 1114 may have an inner bore surface 1147, which may include one or more threaded surfaces formed thereon. As such, there may be a first set of threads configured for coupling the mandrel 1114 with corresponding threads of a setting adapter (not shown here).

The slips 1134, 1142 may be configured with varied gripping elements that may aid or prevent the slips (or tool) from moving (e.g., axially or longitudinally) within the surrounding tubular, whereas otherwise the tool 1102 may inadvertently release or move from its position (see, e.g., buttons or inserts, FIGS. 10A-10D). The inserts 1178 may have an edge or corner suitable to provide additional bite into the tubular surface. In an embodiment, the inserts 1178 may be mild steel, such as 1018 heat treated steel. The use of mild steel may result in reduced or eliminated casing damage from slip engagement and reduced drill string and equipment damage from abrasion. The inserts may be non-metallic, such as ceramic or comparable.

Typically the upper slip 1142 may fracture first before slip 1134. Thus, tension or load may be applied to the tool 1102 that results in movement of cone 1136, which may be disposed around the mandrel 1114 in a manner with at least one surface 1137 angled (or sloped, tapered, etc.) inwardly of upper or second slip 1142. The second slip 1142 may reside adjacent or proximate to collar or cone 1136. As such, the seal element 1122 may force or urge the cone 1136 (and cone surface 1137) against the slip 1142, moving the slip 1142 radially outwardly into contact or gripping engagement with the tubular.

Accordingly, the one or more slips 1134, 1142 may be urged radially outward and into engagement with the tubular 1108. As shown, the first slip 1134 may be at or near distal end 1146, and the second slip 1142 may be disposed around the mandrel 1114 at or near the proximate end 1148. It is within the scope of the disclosure that the position of the slips 1134 and 1142 may be interchanged. That is, in embodiments slips 1134 and 1142 may be used in each other's place. For example, slip 1142 may be the first or bottom slip, and slip 1134 may be the second or top slip. Moreover, slip 1134 may be interchanged with a slip comparable to slip 1142, and vice versa.

Prior to setting an outer slip surface 1190 may be generally planar, and offset from a long axis 1158 of the tool 1102 (or surrounding tubular 1108) by an angle a1 in the range of about 1 degree to about 15 degrees. In embodiments a1 may be between about 5 degrees to about 7 degrees. Post-setting the outer slip planar surface 1190 may be generally parallel to the long axis 1148. 'Parallel' is meant to include a tolerance of less than 1 degree. In the set position, 'parallel' may be emblematic of most of surface 1190 being moved into engagement the tubular 1108. In this respect, the body of slip 1134 may have a pivot movement associated with it beyond that of generally radially outward.

As a result of the pivot-type movement, the layers of the slip may move from parallel to longitudinal forces to being offset. That is a plane of one or more layers of the slip may, upon the slip being set, be at an angle a2 of about 1 degree to about 15 degrees, to a longitudinal axis. In this respect, the interface between respective layers may be offset from longitudinal forces, such as from setting or fluid flow, by about 1 degree to about 15 degrees. Prior to setting, the angle a2 may be substantially parallel, i.e., less than one degree.

The tool 1102 may include an anti-rotation assembly that includes an anti-rotation device or mechanism like that described herein.

Drill-through of the tool 1102 may be facilitated by the fact that the mandrel 1114, the slips 1134, 1142, the cone(s) etc. may be made of drillable material that is less damaging to a drill bit than those found in conventional plugs. Lower or bottommost slip 1134 may be made of composite material, and may be configured to provide the downhole tool 1102 with the characteristic of being able to withstand or hold at 10,000 psi or more.

Referring now to FIGS. 12A, 12B, 12C, and 12D together, a block diagram view of a tethered ball assembly, a block diagram view of a tethered ball assembly with a retainer, a longitudinal side view of a tethered ball assembly, and a longitudinal side view of a tethered ball assembly with one or more eyelets, according to embodiments of the disclosure, are shown.

Components of a tethered ball assembly 1290 of any of the Figures may be made of materials disclosed herein and/or as otherwise may be apparent to one of skill in the art, such as metal, elastomer, plastic, nylon, Teflon, and so forth. In one form, the tethered ball assembly 1290 may include a ball 1285 connected or otherwise coupled with a drag 1289, as shown in FIG. 12A. The ball 1285 may be any type of ball suitable for a downhole ball plug purpose. Although not meant to be limited: the ball 1285 may have a diameter in the range of about 1 inch to about 10 inches; the ball 1285 may have a weight of about 0.1 lbs to about 5 lbs. In a non-limiting example, the ball 1285 may be made of composite material loaded or embedded with metallic filings or shavings. Such a material provides the ball 1285 with an abundance of weight that detracts from disproportionate amounts of undesired movement. Other parameters relevant to the ball 1285 may include weight, breaking strength, material, reactivity, and so on.

The drag 1289 is shown here in box format to illustrate the non-limiting nature of it. Generally the drag 1289 may be any such device or structure suitable to downhole conditions, and provided with an ability to impart hydraulic drag to the assembly 1290 as a result of fluid flow around or against the drag 1289. The drag 1289 may be made of a durable material, such as metal or metallic-based.

The ball 1285 may be coupled to the drag 1289 via a tether 1288. The tether 1288 may be a line- or cable-type structure likewise suitable to downhole conditions, and provided with an ability couple together the ball 1285 and the drag 1289. Parameters relevant to the type of tether 1288 may include length, material, weight, breaking strength, knot strength, limpness, stretch, abrasion resistance, and so forth. The tether 1288 may be a durable material, such as steel, stainless steel, and the like. The tether 1288 may have a braided material, such as braided stainless.

Although not depicted here, the tethered ball assembly 1290 may alternatively not include the drag 1289, and instead have a retainer (e.g., 1287, FIG. 12C). The retainer may be a coupling-type device for coupling the assembly 1290 to a downhole tool (e.g., 1302, FIG. 13A). In aspects, the 'retainer' could be the just an end of the tether 1288, such as in the form of a loop. As such, in some embodiments, the assembly 1290 may just be the ball 1285 with the tether 1288.

FIG. 12B illustrates the tethered ball assembly 1290 may further include a retainer or anchor 1287, which may also be coupled therewith via the tether 1288. In embodiments, the tether 1288 may be multi-portioned, such as a first tether portion and a second tether portion. The drag 1289 may include a parachute-type drag, or any other suitable surface or structure that may be readily associated with the tether 1288. One of skill would appreciate the convenience that assembly 1290 might provide in that it may be readily unseat from a ball seat, and if need be, flowed back to the surface.

FIG. 12C illustrates the drag 1289 may be spherical in nature, with the tether 1288 passing therethrough. A bottom-most or second end of the tether may be coupled to the retainer 1287. As shown, the retainer 1287 may be tantamount to a retainer eyelet, whereby a pin or other such structure may be inserted therein.

In use, fluid flow from one direction may urge and hold the ball 1285 against the seat (not shown here), whereas fluid flow from the opposite direction may urge the ball 1285 off or away from the seat. As such, the ball 1285 may be used to prevent or otherwise control fluid flow through a tool (not shown here). By utilization of the tether 1288 and the retainer 1287, the tethered ball assembly 1290 may be contemplated as a retained or controlled ball plug. As such, the ball 1285 may be adapted to serve as a pseudo check-valve by sealing pressure from one direction, but allowing fluids to pass in the opposite direction.

The drag 1289 may be any suitable surface or structure that may be readily associated with the tether 1288. The drag 1289 may be readily affixed or attached to the tether 1288 including in a permanent connection or quick- (or regular-) disconnect type connection or coupling. A permanent connection may entail a type of connection that only upon destruction of the drag 1289 or other part of the assembly 1290 in some fashion would result in disconnect. For example, a first end of the tether 1288A may be molded or cured internal to the ball 1285, and the only way for the first end to disconnect would be some mode of failure, such as the destruction of the ball 1285.

Whereas an intended disconnect may entail of type of connection that need not result in destruction, such as threads, crimping, ring/clasp, hoop/tieline, push-connect, and so forth.

In a similar manner, the ball 1285 and the retainer 1287 may be comparably connected with the tether via a permanent connection or quick- (or regular-) disconnect type connection or coupling. Thus, as would be apparent to one of skill, various parts of the tethered ball assembly 1290 may be modified, changed, substituted, etc. to fit a particular desired use.

In embodiments, the tether 1288 itself may be configured with a disconnect. For example, the tether 1288 may be configured with one or more tether connections (not shown here). In other embodiments, the assembly 1290 may be configured with a predetermined failure point, such as within the tether 1288. Whereupon encountering a certain amount of force or load, the failure point (yield) within the tether will fail, and the tether will break. Such a configuration may be useful for flowing the ball 1285 back to the surface, even though the assembly 1290 might be retained with the tool 1202.

Briefly, FIG. 12D illustrates a non-limiting example of where one or more eyelets 1291 may be used with the assembly 1290, whereby a first portion of a tether 1288A may be connected to respective eyelets of the ball 1285 and the drag 1289, and a second portion of a tether 1288B may be connected to respective eyelets of another end of the drag 1289 and the anchor 1287. The eyelets 1291 may be coupled in a manner as would be apparent to one of skill in the art, such as threadably, insertion, molded, and so forth.

Referring now to FIGS. 13A, 13B, 13C, and 13D together, a longitudinal side view of a downhole tool having an in-place tethered ball assembly, a longitudinal side view of the downhole tool of FIG. 13A set in a tubular, a longitudinal side view of the downhole tool of FIG. 13A set in a tubular with a ball seated on a ball seat, and a longitudinal side view of a drop-ball tethered ball assembly, according to embodiments of the disclosure, are shown.

Components of a tethered ball 1390 may be made of materials disclosed herein and/or as otherwise may be apparent to one of skill in the art. The tethered ball assembly 1390 may include a ball 1385 connected or otherwise coupled with a drag 1389. The ball 1385 may be coupled to the drag via a tether 1388.

As shown, the downhole tool 1302 may be any type of downhole tool to which a drop ball or ball-in-place may be useful, such as a frac plug. Downhole tool 1302 may be run, set, and operated as described herein and in other embodiments (such as in System 200, and so forth), and as otherwise understood to one of skill in the art. As such, the downhole tool 1302 may be run into a tubular via attachment to a workstring 1312. Components of the downhole tool 1302 may be arranged and disposed about a mandrel 1314, as described herein and in other embodiments, and as otherwise understood to one of skill in the art. Thus, downhole tool 1302 may be comparable or identical in aspects, function, operation, components, etc. as that of other tool embodiments disclosed herein. Similarities may not be discussed for the sake of brevity.

The tool 1302 (or mandrel 1314) may be configured with a ball seat 1386. The ball seat 1386 may be removable or integrally formed therein. Thus, the bore 1350 of the mandrel 1314 may be configured with the ball seat 1386 formed or removably disposed therein. The ball seat 1386 may be configured in a manner so that a ball 1385 may seat or rest therein, whereby the flowpath through the mandrel 1314 may be closed off (e.g., flow through the bore 1350 is restricted or controlled by the presence of the ball 1385).

For example, fluid flow from one direction may urge and hold the ball 1385 against the seat 1386, whereas fluid flow from the opposite direction may urge the ball 1385 off or away from the seat 1386. As such, the ball 1385 may be used to prevent or otherwise control fluid flow through the tool 1302. The ball 1385 may be made of conventional materials or of any other material of the present disclosure, and respective embodiments. Such material may provide the ball 1385 the ability of holding maximum desired pressures experienced during downhole operations (e.g., fracing). By utilization of a tether 1388 and a retainer (or anchor) 1387, the ball 1385 may be contemplated as a retained or controlled ball plug. As such, the ball 1385 may be adapted to serve as a pseudo check-valve by sealing pressure from one direction, but allowing fluids to pass in the opposite direction. The ball seat 1386 may be formed with a radius (i.e., circumferential rounded edge or surface).

The ball 1385 may be a 'ball-in-place' configuration, whereby the ball 1385 may be maintained with the tool 1302 during run-in. The 'ball-in-place' configuration is distinct from a 'drop ball' configuration, whereby the ball 1385 may instead be dropped and flowed down to the tool 1302. Briefly, FIG. 13D illustrates a tethered ball assembly 1390A that may be flowed to the tool 1302. The tethered ball assembly 1390A may include a ball, a tether, and a drag as described herein, but need not be affixed to the tool 1302. The drag 1389 may include a parachute-type drag, or any other suitable surface or structure that may be readily associated with the tether 1388. One of skill would appreciate the convenience that assembly 1390A might provide in that it may be readily unset from the ball seat 1386, and if need be, flowed back to the surface.

Referring again to FIGS. 13A-13C, FIG. 13B in particular illustrates the downhole tool 1302 in a set position with the workstring 1312 detached therefrom. A conventional ball would be prone to detaching from the seat 1386 or tool 1302, and potentially getting lost or stuck in a perforation. However, the retainer 1387 in connection with the tether 1388 may be used to maintain the ball 1385 in a proximate location of the tool 1302. The tether 1388 may be of a length whereby the ball 1386 does not float or move away any appreciable distance from the uppermost surface (e.g., mandrel end) of the tool 1302.

As fluid pressure F is provided in the direction of the tool 1302, fluid may initially pass through the tool 1302 and cause or impart a hydraulic drag force Fd against a drag 1389. Once the draft force Fd is sufficient, the drag 1389 (via tether 1388) may impart a corresponding pulling force against the ball 1385. Eventually the pressure F separately or in combination with the drag force Fd may cause the ball 1385 to completely and sufficiently seat on the ball seat 1386, as shown in FIG. 13C.

The drag 1389 may be any suitable surface or structure that may be readily associated with the tether 1389. The drag 1389 may be readily affixed or attached to the tether 1388 including in a permanent connection or quick- (or regular-) disconnect type connection or coupling. A permanent connection may entail a type of connection that only upon destruction of the drag 1389 or the tether 1388 in some fashion would result in disconnect. Whereas an intended disconnect may entail of type of connection that need not result in destruction, such as threads, crimp, ring/clasp, hoop/tieline, push-connect, and so forth.

In a similar manner, the ball 1385 and the anchor 1387 may be comparably connected with the tether 1388 via a permanent connection or quick- (or regular-) disconnect type connection or coupling. Thus, as would be apparent to one of skill, various parts of the tethered ball assembly 1390 may be modified, changed, substituted, etc. to fit a particular desired use.

In embodiments, one or more eyelets (not shown here) may be used with the assembly 1390. The retainer 1387 may be affixed to the tool 1302 in any manner suitable to maintain the tethered ball assembly 1390, and thus the ball 1385, with the tool 1302. In embodiments, the anchor 1387 may be integral to or part of the mandrel 1314.

Figure 14A:
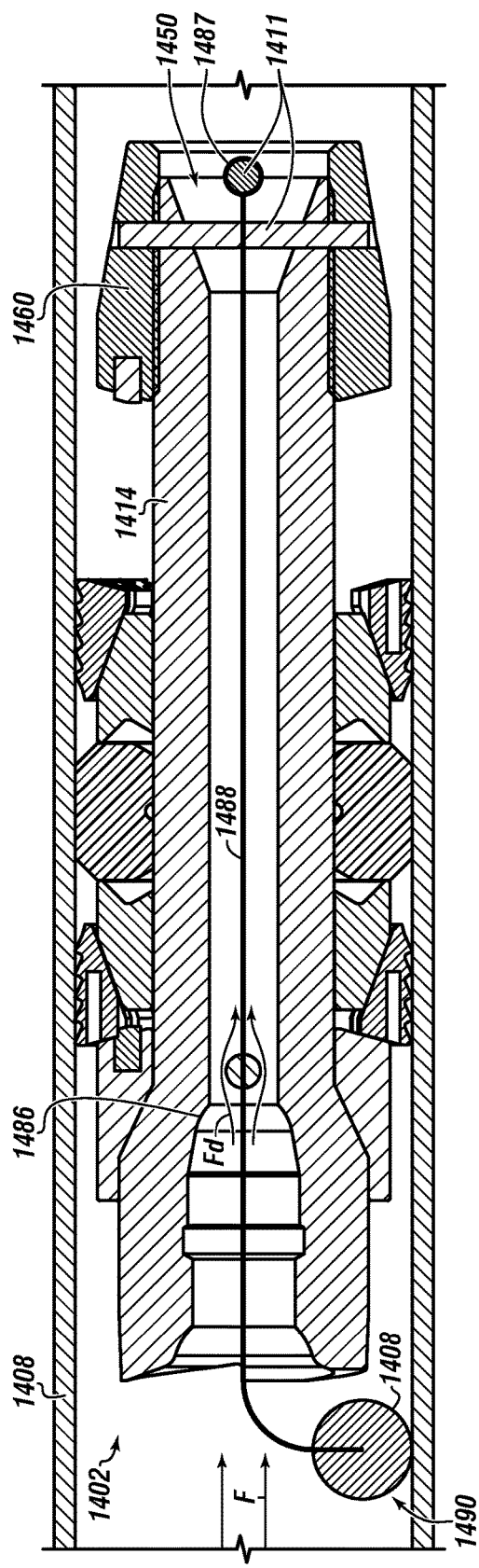
FIG. 14A shows a longitudinal cross-sectional view of a downhole tool with a tethered ball assembly coupled with a pin according to embodiments of the disclosure.
Figure 14B:
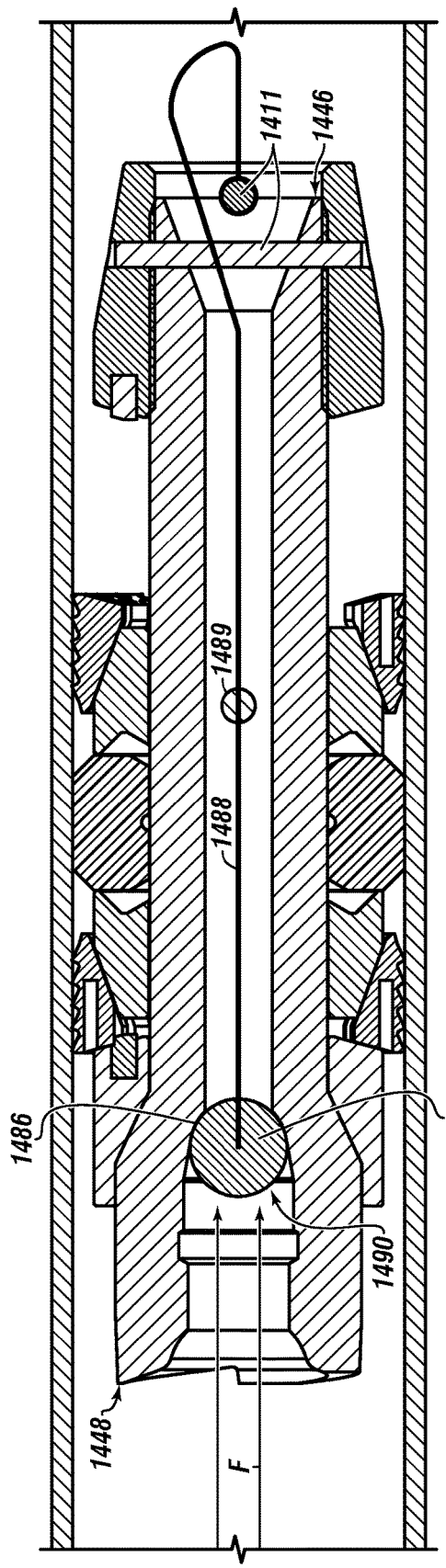
FIG. 14B shows a longitudinal cross-sectional view of the downhole tool of FIG. 14A with a ball seated on a ball seat according to embodiments of the disclosure.

Referring now to FIGS. 14A and 14B together, longitudinal cross-sectional views of a downhole tool with a tethered ball assembly coupled with a pin, according to embodiments of the disclosure, are shown.

Components of a tethered ball assembly 1490 may be made of materials disclosed herein and/or as otherwise may be apparent to one of skill in the art. As shown, the downhole tool 1402 may be any type of downhole tool to which a drop ball or ball-in-place may be useful, such as a frac plug. Downhole tool 1402 may be run, set, and operated as described herein and in other embodiments (such as in System 200, and so forth), and as otherwise understood to one of skill in the art. Thus, downhole tool 1402 may be comparable or identical in aspects, function, operation, components, etc. as that of other tool embodiments disclosed herein. Similarities may not be discussed for the sake of brevity.

As shown in FIGS. 14A and 14B, a wellbore 1406 may be formed in a subterranean formation with a tubular 1408 disposed therein. In an embodiment, the tubular 1408 may be casing (e.g., casing, hung casing, casing string, etc.) (which may be cemented). A workstring (not shown here) may include a part of a setting tool coupled with an adapter, which may be used to position or run the downhole tool 1402 into and through the wellbore 1406 to a desired location. With the adapter in place, the ball 1485 may be prevented from egress from the tool 1402.

In accordance with embodiments of the disclosure, the tool 1402 may be configured as a plugging tool, which may be set within the tubular 1408 in such a manner that the tool 1402 forms a fluid-tight seal against the tubular 1408. Once the tool 1402 reaches the set position within the tubular, the setting mechanism or workstring may be detached from the tool 1402 by various methods. However, after separation of the workstring from the tool 1402, the ball 1485 may no longer be prevented from moving around.

The downhole tool 1402 may include a mandrel 1414 that extends through the tool (or tool body) 1402. The mandrel 1414 may be a solid body. In other aspects, the mandrel 1414 may include a flowpath or bore 1450 formed therein (e.g., an axial bore). The bore 1450 may extend partially or for a short distance through the mandrel 1414. Alternatively, the bore 1450 may extend through the entire mandrel 1414, with an opening at its proximate end 1448 and oppositely at its distal end 1446.

The setting device(s) and components of the downhole tool 1402 may be coupled with, and axially and/or longitudinally movable along mandrel 1414. When the setting sequence begins, the mandrel 1414 may be pulled into tension while a setting sleeve remains stationary. The lower sleeve 1460 may be pulled as well because of its attachment to the mandrel 1414 by virtue of the coupling of threads therebetween. In embodiments, one one or more anchor pins 1411 or the like may be disposed or securely positioned therein, which may also provide coupling between the lower sleeve 1460 and the mandrel 1414. As shown, the retainer 1487 may be coupled with one of the pins 1411.

Advantages

Embodiments of the downhole tool are smaller in size, which allows the tool to be used in slimmer bore diameters. Smaller in size also means there is a lower material cost per tool. Because isolation tools, such as plugs, are used in vast numbers, and are generally not reusable, a small cost savings per tool results in enormous annual capital cost savings.

A synergistic effect is realized because a smaller tool means faster drilling time is easily achieved. Again, even a small savings in drill-through time per single tool results in an enormous savings on an annual basis.

Advantageously, the configuration of components, and the resilient barrier formed by way of the composite member results in a tool that can withstand significantly higher pressures. The ability to handle higher wellbore pressure results in operators being able to drill deeper and longer wellbores, as well as greater frac fluid pressure. The ability to have a longer wellbore and increased reservoir fracture results in significantly greater production.

As the tool may be smaller (shorter), the tool may navigate shorter radius bends in well tubulars without hanging up and presetting. Passage through shorter tool has lower hydraulic resistance and can therefore accommodate higher fluid flow rates at lower pressure drop. The tool may accommodate a larger pressure spike (ball spike) when the ball seats.

The composite member may beneficially inflate or umbrella, which aids in run-in during pump down, thus reducing the required pump down fluid volume. This constitutes a savings of water and reduces the costs associated with treating/disposing recovered fluids.

One piece slips assembly are resistant to preset due to axial and radial impact allowing for faster pump down speed. This further reduces the amount of time/water required to complete frac operations.

While preferred embodiments of the disclosure have been shown and described, modifications thereof can be made by one skilled in the art without departing from the spirit and teachings of the disclosure. The embodiments described herein are exemplary only, and are not intended to be limiting. Many variations and modifications of the embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of the claim.

Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the present disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A downhole tool comprising:
a mandrel configured with a bore and a ball seat;
a tethered ball assembly comprising:
  a ball;
  a spherical drag;
  at least one tether directly connected the ball and the spherical drag; and
  a retainer,
wherein the retainer is coupled to the downhole tool in a manner whereby the ball is free to move off the ball seat only so far as the tether permits.

2. The downhole tool of claim 1, wherein a second tether is directly connected between the retainer and the spherical drag.

3. The downhole tool of claim 2, wherein upon impart of a hydraulic force against the spherical drag, the spherical drag moves from a first position to a second position, wherein the first position coincides with the ball removed from the ball seat, and the second position coincides with the ball engaged with the ball seat.

4. The downhole tool of claim 2, wherein the downhole tool is a frac plug.

5. The downhole tool of claim 4, wherein at least one component of the downhole tool is made of a reactive material.

6. The downhole tool of claim 4, wherein at least one component of the tethered ball assembly is made of a reactive material.

7. A downhole tool comprising:
a mandrel comprising:
  a proximate end;
  a distal end;
  a bore having a ball seat associated therewith; and
  an outer surface;
a first slip disposed around the mandrel;
a second slip disposed around the mandrel;
a lower sleeve proximate to the first slip, and engaged with the outer surface at the distal end;
a tethered ball assembly comprising:
  a ball;
  a spherical drag;
  a retainer;
  at least one tether coupled between the ball and the drag; and
  a second tether is coupled between the retainer and the spherical drag.

8. The downhole tool of claim 7, wherein upon impart of a hydraulic force against the drag, the drag moves from a first position to a second position, wherein the first position coincides with the ball removed from the ball seat, and the second position coincides with the ball engaged with the ball seat.

9. The downhole tool of claim 7, wherein the mandrel is made of filament wound material, wherein the lower sleeve is threadingly engaged with the outer surface, wherein the first slip and the second slip comprise a one-piece configuration, wherein the retainer is coupled to the downhole tool in a manner whereby the ball is free to move off the ball seat only so far as the at least one tether permits.

10. The downhole tool of claim 9, wherein the downhole tool is a frac plug.

11. The downhole tool of claim 10, wherein at least one component of the downhole tool is made of a reactive material.

12. The downhole tool of claim 10, wherein at least one component of the tethered ball assembly is made of a reactive material.

13. A method of using a downhole tool, the method comprising:
running the downhole tool to a desired location within a tubular disposed within a subterranean formation;
seating at least a portion of a tethered ball assembly against a ball seat of the downhole tool, the tether ball assembly having:
  a ball;
  a spherical drag; and
  a tether coupled between the ball and the drag,
wherein upon impart of a hydraulic force against the spherical drag, the drag moves from a first position to a second position, and wherein the second position coincides with seating step.

14. The method of claim 13, wherein the tethered ball assembly is maintained with the downhole tool during the running step.

15. The method of claim 13, the method further comprising:
setting the downhole tool;
after setting, disconnecting the downhole tool from a workstring; and
after disconnecting, flowing the tethered ball assembly from a surface facility to the downhole tool.

16. A downhole tool comprising:
a mandrel configured with a bore and a ball seat;
a tethered ball assembly comprising:
  a ball;
  a movable drag;
  a retainer,
  at least one pliable tether portion coupled between the ball and the spherical drag; and
  a second pliable tether portion coupled directly between the retainer and the spherical drag,
wherein upon impart of a hydraulic force against the movable drag, the movable drag moves from a first position to a second position, wherein the first position coincides with the ball removed from the ball seat, and the second position coincides with the ball engaged with the ball seat, wherein the retainer is coupled to the downhole tool in a manner whereby the ball is free to move off the ball seat only so far as the at least one pliable tether portion and the second pliable tether portion permits.

17. The downhole tool of claim 16, wherein the downhole tool is a frac plug.

18. The downhole tool of claim 16, wherein at least one component of the downhole tool is made of a reactive material.

\* \* \* \* \*